US010848345B2

(12) United States Patent
Choquette et al.

(10) Patent No.: US 10,848,345 B2
(45) Date of Patent: Nov. 24, 2020

(54) MULTI-PROTOCOL ENCAPSULATION TRAFFIC ACCELERATION AND OPTIMIZATION

(71) Applicant: Hughes Network Systems, LLC, Germantown, MD (US)

(72) Inventors: George Joseph Choquette, Potomac, MD (US); Satyajit Roy, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 8 days.

(21) Appl. No.: 16/237,373

(22) Filed: Dec. 31, 2018

(65) Prior Publication Data

US 2020/0213152 A1 Jul. 2, 2020

(51) Int. Cl.
| | |
|---|---|
| *H04L 12/46* | (2006.01) |
| *H04L 12/801* | (2013.01) |
| *H04L 12/911* | (2013.01) |
| *H04L 29/06* | (2006.01) |

(52) U.S. Cl.
CPC .......... *H04L 12/4633* (2013.01); *H04L 47/15* (2013.01); *H04L 47/825* (2013.01); *H04L 63/0478* (2013.01); *H04L 69/18* (2013.01)

(58) Field of Classification Search
CPC ... H04L 12/4633; H04L 47/15; H04L 47/825; H04L 69/18; H04L 63/0478; H04L 63/029
See application file for complete search history.

(56) References Cited

U.S. PATENT DOCUMENTS

| | | | | |
|---|---|---|---|---|
| 2012/0076092 | A1* | 3/2012 | Lu | H04W 28/18 370/329 |
| 2012/0093074 | A1* | 4/2012 | Sairanen | H04W 36/0033 370/328 |
| 2013/0058342 | A1* | 3/2013 | Casado | H04L 41/0816 370/392 |
| 2013/0148541 | A1* | 6/2013 | Zhang | H04L 45/74 370/254 |
| 2017/0048143 | A1* | 2/2017 | Roy | H04L 69/22 |
| 2017/0331859 | A1* | 11/2017 | Bansal | H04L 63/0272 |
| 2018/0294993 | A1* | 10/2018 | Poulin | H04L 12/4633 |
| 2019/0327349 | A1* | 10/2019 | Kwon | H04N 21/2362 |

OTHER PUBLICATIONS

International Search Report and Written Opinion dated Mar. 27, 2020 by the International Searching Authority (European Patent Office) in PCT Application PCT/US2019/068939.

* cited by examiner

*Primary Examiner* — Min Jung
(74) *Attorney, Agent, or Firm* — NovoTechIP International PLLC

(57) ABSTRACT

Data communications methods and systems for data packets transmitted via tunnel sessions. Satellite data communication system providing data communication services between two or more network node devices via a satellite or other data communication system are typically associated with round trip times that can cause delay in the exchange of data. Many conventional protocols, such as TCP, are not well designed for operating across links with such long delays. To address this and provide a more acceptable end-user experience, the system can include a common acceleration and optimization processor configured to provide various network acceleration and/or optimization functions and a tunnel processor configured to provide tunnel protocol-specific processing for multi-protocol encapsulated traffic.

19 Claims, 9 Drawing Sheets

FIG. 2A  FIG. 2B

MULTI-PROTOCOL ENCAPSULATION TRAFFIC ACCELERATION AND OPTIMIZATION

BACKGROUND

For high latency data communication networks, such as geosynchronous Earth orbit (GEO) satellite-based networks, various acceleration and optimization network functions have been employed in order to get high TCP throughput (for example, using TCP spoofing), efficient usage of networks with relatively high costs per bit (for example, by compressing various data portions), and provide overall improvements to end-user quality of experience (QoE).

Some network data flows are conveyed using tunneling protocols, which enable movement of end user data traffic from one network to another. Tunneling protocols can allow private network communications to be sent across a public network, such as the Internet, through a process called tunneling or encapsulation. Also, tunneling allows sending otherwise unsupported protocols across diverse networks, for example, conveying IPv6 over IPv4 or conveying non-IP protocols over IP. Another important use of tunneling is for services that are impractical or unsafe to be offered using only the underlying network services, such as providing a corporate network address to a remote user whose physical network address is not part of the corporate network.

Tunneling of network flows can frustrate efforts at applying the above-noted acceleration and optimization network functions. For example, tunneling that encapsulates TCP traffic can prevent use of TCP performance enhancing proxies (PEPs) to perform TCP spoofing of TCP 3-way handshakes for establishing TCP connections and TCP ACK spoofing to improve performance of TCP windowing algorithms under high latency conditions. Although optimization of tunneled traffic flows has been provided by tunnel-specific handling and transport, as illustrated in U.S. Pat. No. 10,057,391 (entitled "Acceleration of GTP Traffic Flows Over a Satellite Link, in a Terrestrial Wireless Mobile Communications System" and issued on Aug. 21, 2018), which is incorporated by reference herein in its entirety, substantial engineering resources have been required to modify and enhance the underlying transport infrastructure to support and optimize acceleration and optimization of each new and different tunneling protocol.

SUMMARY

A method for facilitating data communication, in accord with a first aspect of this disclosure, includes receiving, at a first network node device, via a local network interface, a first tunnel data packet encapsulating a first payload according to a first tunneling protocol, a second tunnel data packet encapsulating a second payload according to the first tunneling protocol, and a third tunnel data packet encapsulating a third payload according to a second tunneling protocol that is different than the first tunneling protocol. In addition, the method includes identifying a first tunnel session associated with the first tunnel data packet and a second tunnel session associated with the third tunnel data packet that is different than the first tunnel session, and a third step involves generating and maintaining a first packet context for the first tunnel session based on at least the received first tunnel data packet, and a second packet context for the second tunnel session based on at least the received third tunnel data packet. The method further includes determining, based on at least the first packet context and the second tunnel data packet, that the second tunnel data packet is for the first tunnel session. The method also includes de-encapsulating the second payload from the second tunnel data packet in accordance with the first tunneling protocol, in response to the determination that the second tunnel data packet is for the first tunnel session, as well as de-encapsulating the third payload from the third tunnel data packet in accordance with the second tunneling protocol in response to the determination that the third tunnel data packet is for the second tunnel session. Furthermore, the method includes submitting the second payload and the third payload to a common acceleration and optimization processor of the first network node device.

A data communication network node device, in accord with a second aspect of this disclosure, includes a common acceleration and optimization processor, a local network interface, and an input data packet processor. The input data packet processor is configured to receive, via the local network interface, a first tunnel data packet encapsulating a first payload according to a first tunneling protocol, a second tunnel data packet encapsulating a second payload according to the first tunneling protocol, and a third tunnel data packet encapsulating a third payload according to a second tunneling protocol that is different than the first tunneling protocol, as well as identify a first tunnel session associated with the first tunnel data packet and a second tunnel session associated with the third tunnel data packet that is different than the first tunnel session. The input data packet processor is further configured to generate and maintain a first packet context for the first tunnel session based on at least the received first tunnel data packet, and a second packet context for the second tunnel session based on at least the received third tunnel data packet, and determine, based on at least the first packet context and the second tunnel data packet, that the second tunnel data packet is for the first tunnel session. In addition, the input data packet processor is configured to de-encapsulate the second payload from the second tunnel data packet in accordance with the first tunneling protocol in response to the determination that the second tunnel data packet is for the first tunnel session, and de-encapsulate the third payload from the third tunnel data packet in accordance with the second tunneling protocol in response to the determination that the third tunnel data packet is for the second tunnel session. The input data packet processor is also configured to submit the second payload and the third payload to the common acceleration and optimization processor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 2A-2D, presents some examples of data packets communicated via the data communication system shown in FIG. 1. FIG. 2A illustrates an example un-tunneled data packet. FIG. 2B illustrates an example tunnel data packet in which an IP-layer tunneling protocol is employed. FIG. 2C illustrates an example tunnel data packet in which a Layer-2 tunneling protocol is employed. FIG. 2D illustrates an example nested tunnel data packet in which an IP-layer tunneling protocol is carried within a Layer-2 tunneling protocol.

FIG. 5A illustrates, among other operations, operations relating to identifying and processing data packets for tunnels utilizing Layer-2 tunneling protocols. FIG. 5B illustrates, among other operations, operations relating to identifying and processing data packets for tunnels utilizing IP-Layer tunneling protocols. FIG. 5C illustrates, among other operations, operations relating to identifying and processing data packets for tunnels utilizing other tunneling protocols.

DETAILED DESCRIPTION

Figure 1:
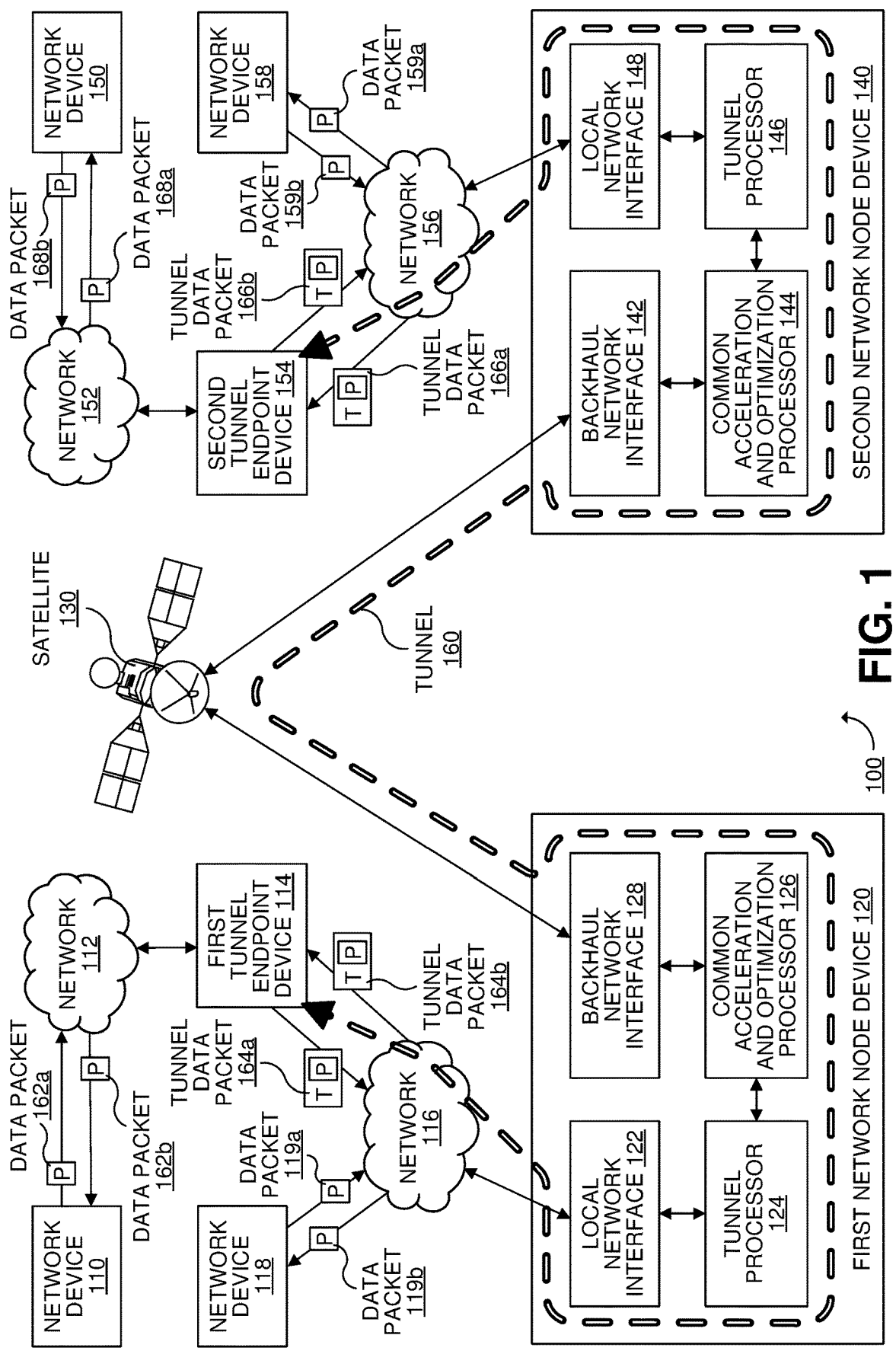
FIG. 1 illustrates an example data communication system configured to implement techniques discussed below.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This disclosure presented improved techniques for accelerating and optimizing tunneled data flows, in which core acceleration and optimization processing of tunneled data flows is separated from tunneling protocol specific processing. These techniques enable providing acceleration and optimization for additional tunneling protocols more easily and seamlessly without any need to modify the underlying transport infrastructure. Additionally, these techniques better ensure that a complete or more complete range of acceleration and optimization functions are applied for each supported tunneling protocol. Additionally, these acceleration and optimization functions can be applied more universally to both tunneled and un-tunneled data flows.

In different implementations, end-users can communicate and/or exchange information via networks. In order to better illustrate some of the proposed implementations, one example of a data communication system is presented with reference to FIG. 1. In this example, the data communication system 100 is implemented as a satellite data communication system providing data communication services between a first network node device 120 and a second network node device 140 via a GEO space satellite 130 (which may be more simply referred to as a "satellite"). It is understood that the techniques described herein may be applied to, and provide benefits for, other types of data communication systems, even if they do not involve communications via a space satellite or involve high latency links. In some examples, the first network node device 120 may be implemented as a very small aperture terminal (VSAT) and the second network node device 140 may be implemented as a satellite gateway operated by a network service provider and providing access to public network resources (such as the Internet) and/or private network resources. In some examples, both the first network node device 120 and the second network node device 140 may be implemented as VSATs communicating via a peer-to-peer satellite link.

In this example, the GEO space satellite 130 operates at approximately 36,000 km above the surface of the Earth. At this distance, the speed of light becomes a significant factor, as it takes approximately 120 milliseconds (ms) for a radio signal to travel between a radio terminal on the Earth's surface and the GEO space satellite 130, resulting in a round trip time (RTT) of approximately 480 ms between the first network node device 120 and the second network node device 140 via the satellite 130, and an even greater RTT between network devices communicating via the satellite link (which may be referred to as a "backhaul link" or "backhaul connection") between the first network node device 120 and the second network node device 140 and one or more intervening networks. The TCP protocol is not well designed for operating across links with such high latency. For example, aspects such as TCP 3-way handshaking used to establish TCP connections and TCP windowing algorithms operate poorly over high-latency links.

To address this and provide a more acceptable end-user quality of experience, the first network node device 120 includes a common acceleration and optimization processor 126 configured to provide various network acceleration and/or optimization functions. For example, some acceleration and optimization functions that may be provided for the end user data that is tunneled over one of the tunneling protocols as mentioned above can include, but are not limited to (1) traffic class prioritization using tunneling protocol header including DSCP marking and as well as headers of the tunneled packets; (2) TCP-specific PEP for tunneled TCP flows (for example, TCP handshake or ACK spoofing); (3) other PEP functions; (4) header compression for tunnel headers and/or other headers of the tunneled packet; (5) DNS prefetching and/or caching; (6) DHCP relay (for IPv4 and/or IPv6); (7) payload compression for tunneled flow data; (8) HTTP acceleration, such as prefetching and/or caching, for tunneled HTTP requests; and/or (9) output jitter reduction for jitter sensitive tunneled applications by using a jitter buffer. Some examples of performance enhancing proxy functions (for example, TCP spoofing) are described in U.S. Pat. Nos. 6,161,141, 6,338,131, 6,701,370, 7,006,480, 6,973,497, 7,213,077, and 7,219,158, which are each incorporated by reference herein in their entireties.

Referring again to FIG. 1, in some implementations, end-users may access a data service (represented by a network device 150) via another network device 110. As an example, network device 150 may be a server or other end-user device with which network device 110 is exchanging data. In this example, network device 110 transmits a data packet 162a via a network 112 to a first tunnel endpoint device 114. The first tunnel endpoint device 114 implements a tunnel session 160 (also referred to herein simply as "tunnel", and described in further detail below) according to a particular tunneling protocol with another second tunnel endpoint device 154 via the backhaul link between the first network node device 120 and the second network node device 140.

As will be shown in greater detail further below, the first tunnel endpoint device 114 can encapsulate data packet 162a or a portion thereof according to a tunneling protocol-specific encoding within a tunnel data packet 164a and deliver the tunnel data packet 164a to the first network node device 120 via network 116. A tunnel data packet may also be referred to as a "tunnel encapsulated data packet" or an "encapsulated data packet." As a general matter, tunnel data packets can be understood to include a data payload carrying a user packet that is encapsulated by one or more tunneling protocol-specific portions. A few examples of some tunneling protocols that may be used include, but are not limited to (1) IPIP (Internet Protocol number 4): IP in IPv4/IPv6 as described in RFC 2003; (2) SIT/IPv6 (Internet Protocol number 41): IPv6 in IPv4/IPv6 as described in RFC 2473; (3) Teredo tunneling (UDP destination port 3544) as described in RFC 4380; (4) GRE (Internet Protocol number 47): Generic Routing Encapsulation as described in RFC 2784 and RFC 2890; (5) L2TP (Internet Protocol number 115): Layer 2 Tunneling Protocol using UDP datagrams as described in RFC 3931; (6) VXLAN (UDP destination port 4789): Virtual Extensible Local Area Network as described in RFC 7348; (7) PPTP: Point to point tunneling protocol as described in RFC 2637; (8) GPRS Tunneling Protocol (GTP) for cellular backhaul; (9) Layer-2 802.1Q and/or 802.1ad tunnels; (10) Multiprotocol Label Switching (MPLS) (EtherTypes 0x8847 and 0x8848); and/or (11) MPLS-in-IP (Internet Protocol number 137): MPLS encapsulated in IP as described in RFC 4023 and RFC 5332, as well as any future tunneling protocols designed by IETF or other standards bodies. For purposes of clarity, some more specific examples of tunnel data packets for some of the above tunneling protocols are illustrated and will be described with reference to FIGS. 2B-2D.

By application of various operations described herein, a payload encapsulated by the tunnel data packet 164a, and associated data, can be transmitted from the first network node device 120 to the second network node device 140 with a reduced amount of data and re-generated by the second network node device 140 to produce a corresponding tunnel data packet 166a, thereby accelerating communication between the network device 110 and the network device 150 through the tunnel 160. It should be understood that in different implementations, the benefits of the disclosed implementations are also applicable to un-tunneled data communications. For example, FIG. 1 shows a network device 118 which transmits an un-tunneled data packet 119a via the network 116 to the first network node device 120 via the backhaul link with the second network node device 140 for delivery to a network device 158 as a data packet 159a. Acceleration and optimization functions offered by the common acceleration and optimization processor 126, such as TCP PEP, may be applied for the data packets 119a and 159a.

For purposes of reference, additional detail regarding the first network node device 120 will now be provided. In the example of FIG. 1, the first network node device 120 includes a local network interface 122, a tunnel processor 124, the common acceleration and optimization processor 126, and a backhaul network interface 128. Similarly, in some implementations, the second network node device 140 includes a local network interface 148, a tunnel processor 146, a common acceleration and optimization processor 144, and a backhaul network interface 142. For certain network data flows, the first network node device 120 and/or the second network node device 140 are configured to receive and transmit data via respective networks 116 and 156 in the form of tunnel data packets, such as the tunnel data packets 164a, 164b, 166a, and 166b shown in FIG. 1.

As noted above, the first network node device 120 includes the local network interface 122. In different implementations, the local network interface 122 is adapted to exchange data via the network 116 (which, in some implementations, may be referred to as a "local network"), which may be implemented as one or more wired and/or wireless networks. The first network node device 120 also includes the backhaul network interface 128, which is configured to exchange data via the satellite 130, such as via Ka-band and/or Ku-band radio frequency (RF) data communications. Furthermore, the tunnel processor 124 of the first network node device 120 is configured to, for multiple different tunneling protocols, identify associated tunnel data packets, and extract their encapsulated payloads for processing by the common acceleration and optimization processor 126. Additionally, the tunnel processor 124 delivers un-tunneled data packets to the common acceleration and optimization processor 126, allowing the acceleration and optimization features provided by the common acceleration and optimization processor 126 to be applied to both tunnel data packets and un-tunneled data packets.

Thus, it can be understood that some aspects of the first network node device 120 described herein can be adapted to share information with one another, thereby facilitating improvement of end-user quality of experience. Together, the tunnel processor 124 and the common acceleration and optimization processor 126 operate to substantially reduce the volume of, and costs for, traffic that is transferred via the satellite 130 while at the same time reducing apparent latency experienced by end-users of the first network node device 120. The common acceleration and optimization processor 126 is configured to generate data for transmission via the backhaul network interface 128 based on data received from the tunnel processor 124. In addition, the common acceleration and optimization processor 126 is configured to receive data from the backhaul network interface 128 and provide corresponding data to the tunneling processor 124 which in turn generates tunnel data packet(s) 164b that are output via the local network interface 122 and subsequently received by the first tunnel endpoint device 114, which delivers corresponding data packets 162b to the network device 110.

It should further be understood that some or all of the features and operations of the first network node device 120 described above can also be applicable to the second network node device 140. Thus, in some implementations, data transmission arrangement on the 'opposite' or corresponding side of the data communication system 100 can be substantially similar to that described above with respect to the end-user and network device 110. In different implementations, a data service (represented by network device 150) can communicate with end-users via a network 152. In this example, network device 150 transmits a data packet 168b via a network 152 to a second tunnel endpoint device 154 to be conveyed via the tunnel 160. The second tunnel endpoint device 154 can encapsulate data packet 168b or a portion thereof according to a tunneling protocol-specific encoding within a tunnel data packet 166b and deliver the tunnel data packet 166b to the second network node device 140 via network 156. A payload encapsulated by tunnel data packet 166b, and associated data, can be transmitted to the first network node device 120 with a reduced amount of data and re-generated by the first network node device 120 to produce a corresponding tunnel data packet 164b, thereby accelerating communication between the network device 150 and the network device 110 through the tunnel 160.

As noted above, the second network node device 140 includes local network interface 148. In different implementations, the local network interface 148 is adapted to exchange data via local network 156, which may be implemented as one or more wired and/or wireless networks. The second network node device 140 also includes the backhaul network interface 142, which is configured to exchange data via the satellite 130, such as via Ka-band and/or Ku-band RF data communications. Furthermore, as with the tunnel processor 124 of the first network node device 120, the tunnel processor 146 of the second network node device 140 is configured to, for multiple different tunneling protocols, identify associated tunnel data packets, and extract their encapsulated payloads for processing by the common acceleration and optimization processor 144, allowing the acceleration and optimization features provided by the common acceleration and optimization processor 144 to be applied to both tunnel data packets and un-tunneled data packets. It is noted that the benefits obtained by the tunnel processors 124 and 146 and the common acceleration and optimization processors 126 and 144 are obtained in part by interoperation of the tunnel processors 124 and 146 and interoperation of the common acceleration and optimization processors 126 and 144 of the two network node devices 120 and 140, such as by use of common communication protocols to exchange tunnel- and packet-related information via the backhaul link between the first network node device 120 and the second network node device 140.

Together, the tunnel processor 146 and the common acceleration and optimization processor 144 operate to substantially reduce the volume of, and costs for, traffic that is transferred via the satellite 130 while at the same time reducing apparent latency experienced by end-users of the first network node device 140. The common acceleration and optimization processor 144 is configured to generate data for transmission via the backhaul network interface 142 based on data received from the tunnel processor 146. In addition, the common acceleration and optimization processor 144 is configured to receive data from the backhaul network interface 142 and provide corresponding data to the tunneling processor 146 which in turn generates tunnel data packet(s) 166a that are output via the local interface 148 and subsequently received by the second tunnel endpoint device 154, which delivers corresponding data packets 168a to the network device 150.

As with the first network node device 120, it should be understood that in different implementations, the benefits of the disclosed implementations of the second network node device 140 are also applicable to un-tunneled data communications. For example, FIG. 1 shows network device 158 which transmits an un-tunneled data packet 159b via the network 156 to the second network node device 140 for delivery to the network device 118 as a data packet 119b. Acceleration and optimization functions offered by the common acceleration and optimization processor 144, such as TCP PEP, may be applied to the data packets 119b and 159b.

Figure 2C:
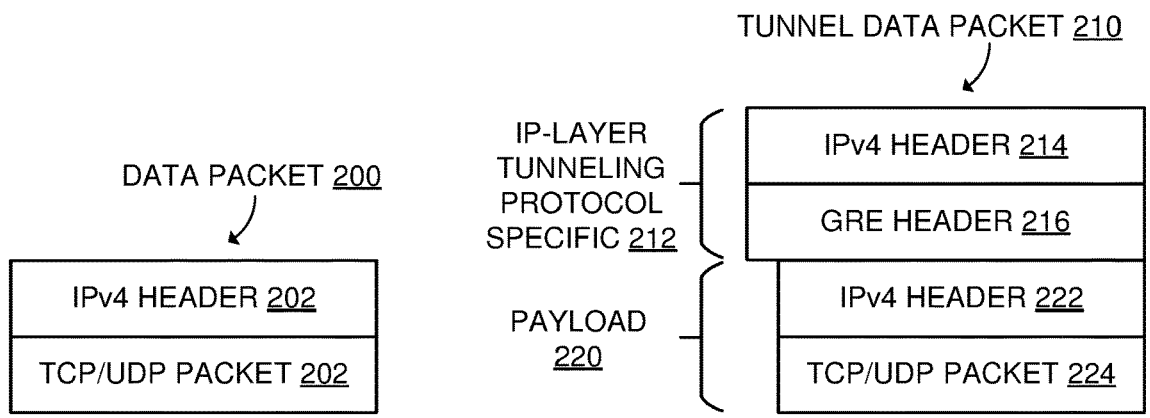
Figure 2C:
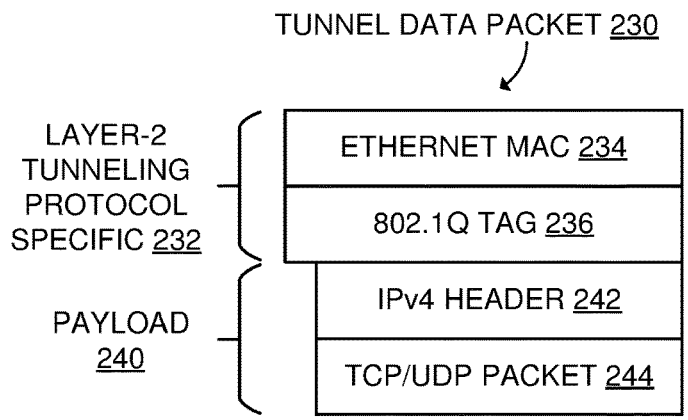

Referring next to FIGS. 2A-2D, some examples of data packets communicated via the data communication system 100 shown in FIG. 1 are presented, including data packets 200, 210, 230, and 250. Some data packets, as noted earlier, can be identified as tunnel data packets for associated tunnel sessions according to associated tunneling protocols. In this example, the data packets 210, 230, and 250 are tunnel data packets, whereas the data packet 200 is an un-tunneled data packet. In FIG. 2A, an example of an un-tunneled data packet 200 is shown. In different implementations, the un-tunneled data packets 119a, 119b, 159a, and 159b in FIG. 1 may have similar structures to the un-tunneled data packet 200 in FIG. 2A. In this example, the un-tunneled data packet 200 is an IPv4 TCP or UDP data packet, and accordingly the un-tunneled data packet 200 includes an IPv4 header portion 202 and a TCP/UDP packet portion 204 (which in turn includes a TCP or UDP data portion that is not separately illustrated in FIG. 2A). It is to be understood that the un-tunneled data packet 200 is not limited to IPv4 TCP or UDP data packets. However, for example, the common acceleration and optimization processor 126 of FIG. 1 may include various acceleration and/or optimization functions that are applied to selected TCP packets, such as TCP PEP. For convenience of illustration and discussion, FIG. 2A does not illustrate portions of the un-tunneled data packet 200 corresponding to OSI layers 1 and 2, including, for example, a Layer-2 header portion of the un-tunneled data packet 200.

In addition, FIG. 2B illustrates an example tunnel data packet 210, in which the GRE tunneling protocol, an IP-layer tunneling protocol, is employed. The tunnel data packet 210 includes an IP-layer tunneling protocol specific portion 212 and a payload 220 (which may be referred to as an "encapsulated payload"). The IP-layer tunneling protocol specific portion 212 includes an IPv4 header 214 and a GRE header 216. The payload 220 may have content similar to the data packet 200 shown in FIG. 2A, including an IPv4 header portion 222 and a TCP/UDP packet portion 224. It can further be observed that the payload 220 is encapsulated by or within the tunnel data packet 210.

It is noted that although for some tunneling protocols, such as the example of the GRE tunneling protocol shown in FIG. 2B, encapsulation of a payload is performed simply by prepending one or more associated header portions to the payload, some tunneling protocols use other approaches for performing encapsulation. For example, various tunneling protocols may perform encapsulation of a payload by one or more of prepending data before the payload, appending data after the payload, inserting data within the payload, and/or reencoding the payload into different encoding format (for example, to provide an encoding that allows error detection and/or error correction to be performed on a received tunnel data packet and/or its encapsulated payload).

FIG. 2C illustrates an example tunnel data packet 230, in which the IEEE 802.1Q tunneling protocol is employed in a Layer-2 Ethernet packet. The tunnel data packet 230 includes a Layer-2 tunneling protocol specific portion 232 and a payload 240. The Layer-2 tunneling protocol specific portion 232 includes an Ethernet MAC 234 and an 802.1Q tag 236. The payload 240 may have content similar to the data packet 200 shown in FIG. 2A, including an IPv4 header portion 242 and a TCP/UDP packet portion 244. It can further be observed that the payload 240 is encapsulated by or within the tunnel data packet 230.

Figure 2D:
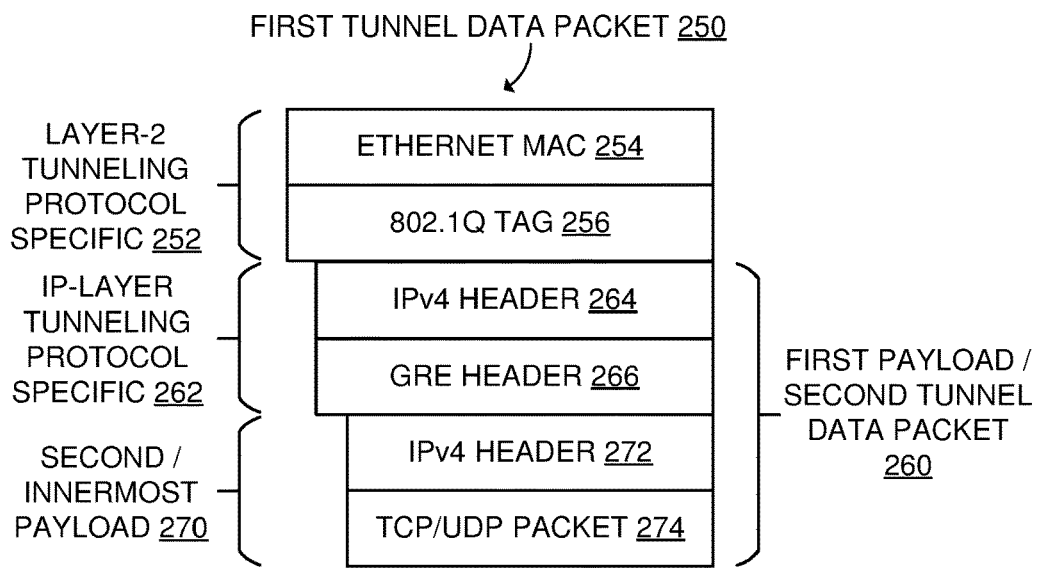

In different implementations, tunnel data packets may further be nested within tunnel data packets where a first tunnel session is being conveyed by a second tunnel session. A nested tunnel data packet is a type of tunnel data packet and may also be referred to as a "recursive tunnel data packet." FIG. 2D illustrates one example nested tunnel data packet in which the GRE tunneling protocol is employed within the IEEE 802.1Q tunneling protocol. In this example, a first tunnel data packet 250 includes an Ethernet MAC 254, an 802.1Q tag 256, IPv4 header 264, a GRE header 266, an IPv4 header portion 272, and a TCP/UDP packet portion 274. For purposes of clarity, the Ethernet MAC 254 and 802.1Q tag 256 will be collectively referred to as a Layer-2 tunneling protocol specific portion 252, and the IPv4 header 264 and GRE header 266 will be collectively referred to as an IP-layer tunneling protocol specific portion 262.

It can be observed that the first tunnel data packet 250 encapsulates a second tunnel data packet, also referred herein to as a first payload 260. The first payload 260 includes both the IP-layer tunneling protocol specific portion 262 as well as the IPv4 header portion 272, and TCP/UDP packet portion 274, where the IPv4 header portion 272, and TCP/UDP packet portion 274 comprise a second payload 270. In some implementations, the second payload 270 may have content similar to the data packet 200 shown in FIG. 2A. As the second payload 270 does not provide tunnel encapsulation for a further payload, the second payload 270 may also be referred to as the "innermost" payload of the first tunnel data packet 250. Likewise, the payload 220 in FIG. 2B and the payload 240 in FIG. 2C are also the innermost payloads of their respective tunnel data packets 210 and 230.

Because the first payload 260 includes or encapsulates the second payload 270, it can be understood in this example that the first tunnel data packet 250, by encapsulation of the first payload 260, also encapsulates the second payload 270. Thus, the first tunnel data packet 250 of FIG. 2D comprises a nested tunnel data packet. For nested tunnel data packets, such as the first tunnel data packet 250, more than one layer of tunneling protocol specific encapsulation must be recognized and processed by the tunnel processor 124 in order to obtain and provide a de-encapsulated IPv4 header portion 272 and TCP/UDP packet portion 274 to the common acceleration and optimization processor 126 (see FIG. 1) for processing.

In addition, in some circumstances, a payload in a nested tunnel data packet can be associated with either a parent tunnel or child tunnel. As a general matter, a "parent" tunnel (or outer tunnel) can include a "child" tunnel (or inner tunnel) nested within the parent tunnel and configured to transport or convey a corresponding data packet layer. In some circumstances, a first parent tunnel may also be a child tunnel of a second parent tunnel. In some circumstances, a first child tunnel may also be a parent tunnel of a second child tunnel. In the example of FIG. 2D, the first payload 260 is conveyed by an outermost tunnel according to the IEEE 802.1Q tunneling protocol, while the second payload 270 is conveyed by a first inner tunnel or sub-tunnel that is 'within' the outermost tunnel. In this case, the outermost tunnel is a parent tunnel, with the first inner tunnel as its respective child tunnel.

For purposes of clarity, had the data packet illustrated in FIG. 2D included another nested data packet layer ("third payload") encapsulated by the second payload 270, this third payload would be conveyed by a second inner tunnel that would be provided within and encapsulated by the first inner tunnel, which in turn was further encapsulated by the outermost tunnel. Thus, for purposes of reference, the term "parent" tunnel will be used to describe a tunnel that encapsulates another (more inner) tunnel. Similarly, a "child" tunnel will be used to describe the tunnel that is being encapsulated by the (more outer) parent tunnel. Depending on the arrangement being described, in some cases a first inner tunnel may be identified as a parent tunnel and a second inner tunnel may be identified as a child tunnel, while in another case the same second tunnel may be identified as a parent tunnel for a third inner tunnel. Additional nested data packet layers would similarly be conveyed by corresponding additional inner tunnels. Each additional inner tunnel would be increasingly distal to the outermost parent tunnel and/or would be disposed or encapsulated within an increasing number or series of inner tunnels that approach an innermost payload being conveyed by the nested arrangement of tunnels.

Figure 3:
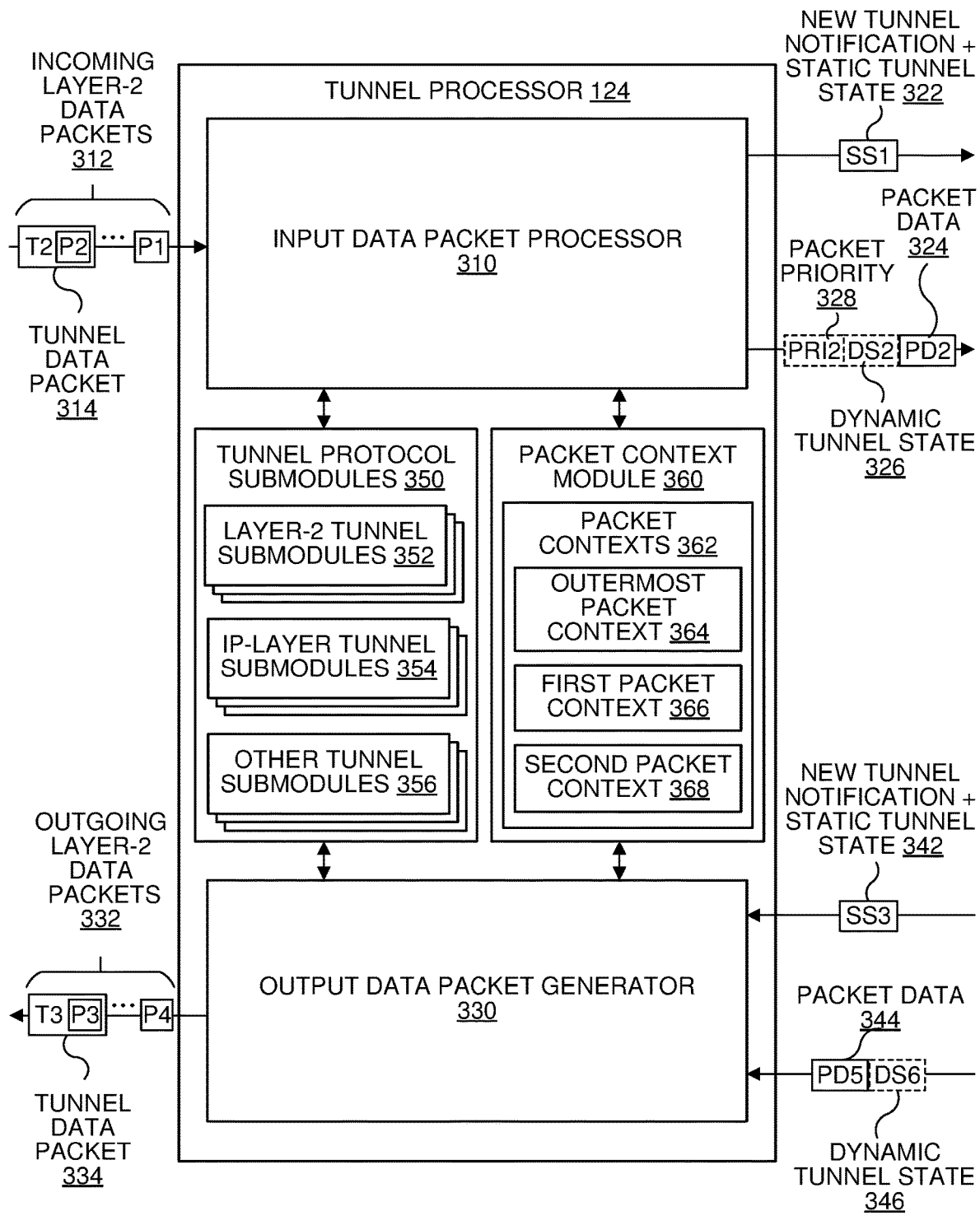
FIG. 3 illustrates an example implementation of the tunnel processor shown in FIG. 1.

For purposes of clarity, FIG. 3 illustrates an example implementation of the tunnel processor 124 shown in FIG. 1. In different implementations, the tunnel processor 124 includes an input data packet processor 310 configured to receive incoming Layer-2 data packets 312 (including a tunnel data packet 314) from the local network interface (see local network interface 122 of FIG. 1) and process the received data packets, including identifying new tunnel sessions and identifying tunnel data packets for supported tunneling protocols. It should be understood that each new tunnel session identified by the input data packet processor 310 can be associated with a plurality of tunnel data packets.

In different implementations, the input data packet processor 310 utilizes a plurality of tunneling protocol submodules 350, each corresponding to a different supported tunneling protocol (which may be referred to as a 'tunnel type'), in order to facilitate identification of tunnel sessions, associated tunnel data packets, and perform tunneling protocol-specific processing. For purposes of reference, the tunneling protocol submodules 350 may include one or more of Layer-2 tunneling protocol submodules 352, one or more IP-Layer tunneling protocol submodules 354, and/or one or more other tunneling protocol submodules 356 (for tunneling protocol submodules not included in the Layer-2 tunneling protocol submodules or the IP-Layer tunneling protocol submodules 354). Although examples are presented using three categories of tunneling protocols ("Layer-2," "IP-Layer," and "other"), in other examples there may be additional and/or different categories.

In an example in which the tunnel data packet 314 is for a new tunnel session and is received by the input data packet processor 310, the input data packet processor 310 can, with reference to tunneling protocol submodules 350, associate a tunnel protocol submodule with the newly identified tunnel session. In conjunction with this association, a tunnel type is also identified for the tunnel session (for example, implicitly in connection with the association with the tunnel protocol submodule).

In connection with identifying a new tunnel session, the input data packet processor 310 makes use of a packet context module 360 to instantiate a new packet context (in this example, referred to as first packet context 366) for the new tunnel session. The packet context module 360 can be configured to generate and maintain multiple packet contexts 362, including, for example, the first packet context 366, in different implementations. In some circumstances, the input data packet processor 310 may identify hundreds or thousands of tunnel sessions, each with a respective packet context 362 maintained by the packet context module 360. In some implementations, a packet context may be generated at least in part by reference to data provided by the corresponding tunnel protocol submodule associated with the tunnel session (see tunneling protocol submodules 350).

In addition, for example in implementations that support processing of nested tunnel data packets (see FIG. 2D), the packet context module 360 can be configured to generate a packet context 362 for each 'layer' of a given nested tunnel session. Thus, the input data packet processor 310 can distinguish or recognize multiple packet contexts as appropriate for each layer of nested tunnel data packets. As there are parent/child relationships between the nested tunnel sessions for a nested tunnel data packet, there are corresponding parent/child relationships between the corresponding packet contexts of each layer.

Figure 4:
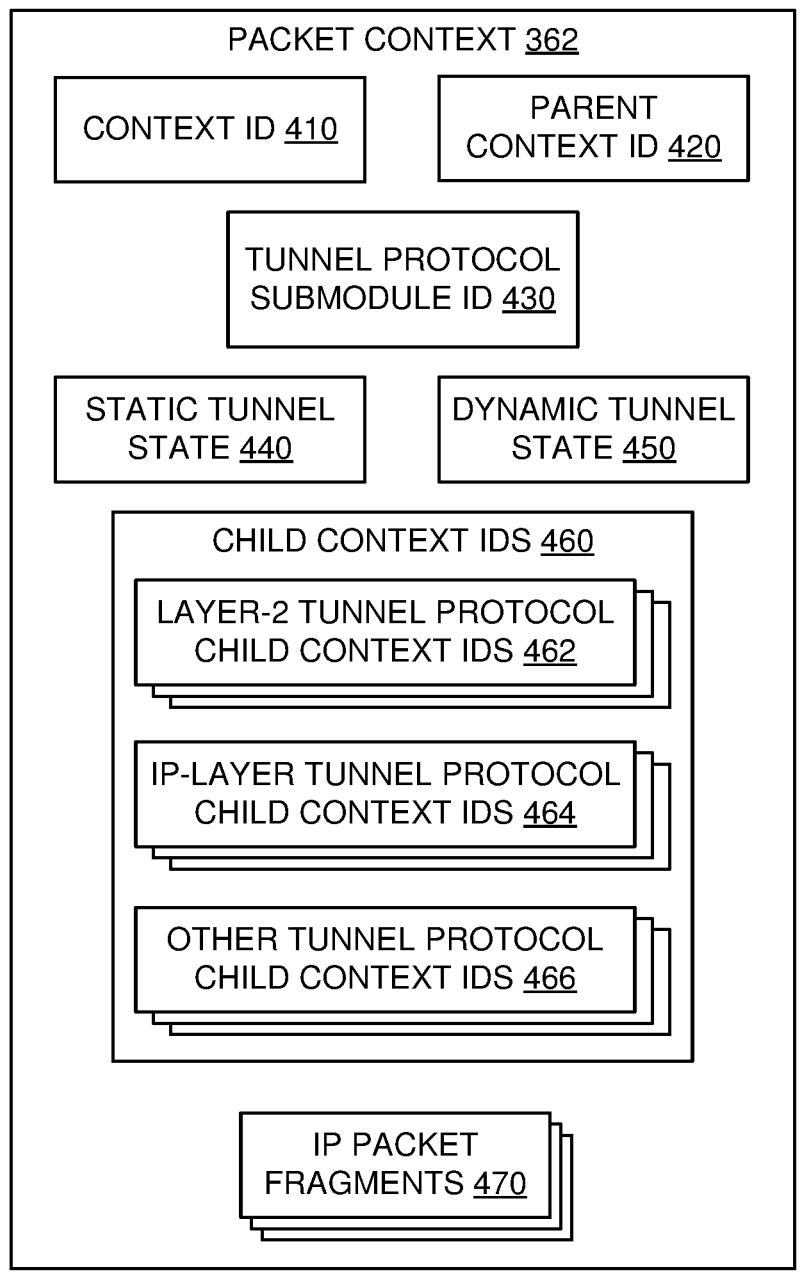
FIG. 4 illustrates an example of a content of a packet context generated, maintained, and used by the tunnel processor shown in FIG. 1.

In order to allow the reader to better appreciate the examples described herein, a more detailed example of a content of a packet context 362 (for example, the first packet context 366, a second packet context 368, etc.) is presented with reference to FIG. 4. In FIG. 4, the packet context 362 includes a context identifier 410, an optional parent context identifier 420, tunneling protocol submodule identifier 430, static tunnel state 440, an optional dynamic/current tunnel state 450, child contexts identifiers 460, and IP packet fragments 470. For purposes of the example shown in FIG. 4, the term "identifier" should be understood to include a numeric or alphanumeric value and/or a pointer to an object, structure, or value in a memory.

In different implementations, the tunnel processor 124 can include provisions for facilitating identification and selection of a packet context 362. For example, in FIG. 4, the context identifier 410 is a unique identifier assigned to and associated with the packet context 362. The context identifier may also be referred to as a "tunnel identifier." In some implementations, the context identifier 410 may include a portion indicating a tunneling protocol type for the packet context 362. Furthermore, in implementations that support processing of nested tunnel data packets (see FIG. 2D), the packet context 362 can further include the parent context identifier 420. The parent context identifier 420 can be configured to identify a packet context for the data packet that encapsulates the packet context 362. For example, for the first packet context 366, the parent context is the outermost packet context 364. As another example, the outermost parent context 364 has no parent context. In addition, the tunneling protocol submodule identifier 430 provides a unique identifier for the tunneling protocol submodule 350 that is associated with the packet context 362, and which may be used by the tunnel processor 124 to identify and select one of the multiple tunnel protocol submodules 350.

Furthermore, the static tunnel state 440 stores data describing encapsulation information, such as header fields, which is re-used for one or more first portions of the tunnel data packets for the tunnel session associated with the packet context 362 or can be used to calculate, without additional packet-specific encapsulation information, one or more other second portions of the tunnel data packets for the tunnel session. In some implementations, the static tunnel state 440 is for tunnel session-specific information that may be different between two different tunnel sessions of the same tunneling protocol. In addition, the dynamic/current tunnel state 450 stores packet-specific data describing encapsulation information, for the most recent tunnel data packet for the tunnel session associated with the packet context 362, for one or more third portions of tunnel data packets for the tunnel session that may change without a pattern described and/or determined by the static tunnel state 440. These third portions may be described as being irregular, variable, or erratic. For some tunneling protocols, a first portion of the dynamic tunnel state may be for the tunnel data packet previously received by the input data packet processor 310 for the tunnel session, and a second portion may be for the tunnel data packet previously output or generated by the output data packet generator 330 for the tunnel session. In some implementations, the input data packet processor 310 is configured to use the tunnel protocol submodule associated with a packet context to generate the static tunnel state 440 when a new packet context is instantiated and to generate a dynamic tunnel state for each tunnel data packet received for the packet context. The content, encoding, and formatting of the static tunnel state 440 and the dynamic tunnel state 450 may be determined by the generating tunnel protocol submodule and treated as an opaque data "blob" that is stored and/or transferred by other portions of the first network node 120 without modification (including, for example, via the satellite 130).

As one example, for the tunnel data packet 210 shown in FIG. 2B, in which the payload 220 is encapsulated according to the GRE tunneling protocol, portions re-used in tunnel data packets for a same GRE tunnel session and included in the static tunnel state 440 would include the fields of the IPv4 header 214 and GRE header 216 that are unchanged across tunnel data packets of a single GRE tunnel session, such as the Version, Source IP Address, Destination IP Address, Time to Live, Flags, and Internet Header Length fields of the IPv4 header 214, and the Checksum Present (C), Routing Present (R), Key Present (K), Sequence Number Present (S), Strict Source Route Present (s), Acknowledgement Sequence Number Present (A), Flags, Version (Ver), Protocol Type, and Key fields of the GRE header 216. It is noted that although the Version and Protocol fields of the IPv4 header 214 are unchanged across tunnel data packets, they are not tunnel session-specific, as in all GRE tunnel sessions the Version field has a value of 4 and the Protocol field has a value of 47; accordingly, the Version and Protocol fields of the IPv4 header 214 may not be included in the static tunnel state 440. Portions of the tunnel data packet 220 which can be used to calculate corresponding portions of tunnel data packets for a same GRE tunnel session and included in the static tunnel state 440 would include fields such as the Sequence Number field of the GRE header 216 (which is simply incremented by one on each tunnel data packet transmitted). A dynamic tunnel state 450 would be generated, for each tunnel data packet of a GRE tunnel session, from the fields of the IPv4 header 214 and GRE header 216 which may change irregularly in the middle of a GRE tunnel session, such as the Type of Service (ToS) field of the IPv4 header 214. The dynamic tunnel state 450 is used by the output data packet generator 330 (for example, including an output data packet generator included in the tunnel processor 146 of the second network node device 140) to effectively re-generate a tunnel data packet after corresponding data is transmitted via the backhaul network interface 128 (see FIG. 1).

As another example, for the tunnel data packet 230 shown in FIG. 2C, in which the payload 240 is encapsulated according to the IEEE 801.1Q tunneling protocol, portions re-used in tunnel data packets for a same IEEE 801.1Q tunnel session and included in the static tunnel state 440 would include the fields of the Ethernet MAC 234 and 801.1Q tag 236 that are unchanged across tunnel data packets of a single IEEE 801.1Q tunnel session, such as the Destination MAC Address, Source MAC Address, and EtherType/VLAN Protocol ID fields of the Ethernet MAC 234. A dynamic tunnel state 450 would be generated, for each tunnel data packet of an IEEE 801.1Q tunnel session, from the fields of the Ethernet MAC 234 and 801.1Q tag 236 which may change irregularly in the middle of an IEEE 801.1Q tunnel session, such as the VLAN Priority Code Point (PCP) and VLAN identifier (VID) fields of the 801.1Q tag 236.

The child context identifiers 460 identify packet contexts for tunnel sessions that have been identified for the packet context 362. For example, the first packet context 366 would be identified as a child context of the outermost packet context 364. In some implementations, as shown in FIG. 4, the child context identifiers 460 may be segregated into different groups such as Layer-2 tunneling protocol child context identifiers 462, IP-layer tunneling protocol child context identifiers 464, and/or other tunneling protocol child context identifiers 466. This segregation facilitates the process 500 described further below with reference to FIGS. 5A and 5B. Furthermore, IP packet fragments 470 are IP packet fragments that have been received within the packet context 362 and for which additional IP packet fragments are required to reassemble complete un-fragmented IP packets for processing in connection with IP-Layer tunneling protocols (additional details will be provided with reference to FIG. 5A).

Returning now to FIG. 3, it can be seen that in response to identifying the new tunnel session for which the first packet context 366 has been instantiated, the input data packet processor 310 issues a new tunnel notification 322 to the common acceleration and optimization processor 126 that includes a tunneling protocol identifier (for example, the tunnel protocol submodule identifier 430 or other unique identifier for the tunnel protocol submodule for the new first packet context 366) and the static tunnel state 440 (see FIG. 4) of the first packet context 366. In some examples, the new tunnel notification 322 may include the context identifier 410 (to associate an identifier with the tunnel session) of the new first packet context 366 and/or the parent context identifier 420 (for example, if nested tunneling is supported) of the new first packet context 366.

In response to receiving the new tunnel notification 322 from the input data processor 310, the common acceleration and optimization processor 126 transmits corresponding data via the backhaul network interface 128 and the satellite 130 to the common acceleration and optimization processor 144 included in the second network node device 140 (see FIG. 1). For example, the common acceleration and optimization processor 126 may transmit data indicating a new tunnel has been identified, the tunneling protocol identifier, the static tunnel state, the context identifier, and/or the parent context identifier received from the input data packet processor 310. In some implementations, instead of providing the new tunnel notification 322 to the common acceleration and optimization processor 126, the input data packet processor 310 provides the new tunnel notification 322 to the backhaul network interface 128 or other portion of the first network node device 120 for transmission of corresponding data via the backhaul network interface 128 and the satellite 130 to the second network node device 140.

In response to receiving via the backhaul network interface 128 such data indicating a new tunnel was identified by another network node device (such as the second network node device 140), the common acceleration and optimization processor 126 may be configured to provide a corresponding notification 342 to the output data packet generator 330, in response to which the output data packet generator 330 instantiates a corresponding new packet context 362. In some implementations, instead of using the common acceleration and optimization processor 126 to provide the notification 342, the first network node device 120 is configured to receive a context identifier, tunneling protocol identifier, and/or static tunnel state via the backhaul network node interface 128 and provide the corresponding notification 342 to the output data packet generator 330.

In an example in which the tunnel data packet 314 is received for a previously identified tunnel session, the input data packet processor 310 is configured to identify one or more corresponding packet contexts 362 (multiple packet contexts 362 may be identified for a nested tunnel data packet). For example, for the tunnel data packet 210 shown in FIG. 2B, a single packet context 362 (for a GRE tunnel session) would be identified whereas for the first tunnel data packet 250 in FIG. 2D, two packet contexts 362 (one for an IEEE 802.1Q tunnel session, and another for a child GRE tunnel session) would be identified.

Whether the tunnel data packet 314 is identified as being for a new tunnel session or not, the input data packet processor 310 further obtains the innermost payload of the tunnel data packet 314 and provides the de-encapsulated innermost payload as packet data 324, along with the context identifier 410 (see FIG. 4) for a packet context 362 of the innermost payload, to the common acceleration and optimization processor 126 (see FIG. 1). If there is a dynamic tunnel state 450 associated with the tunnel data packet 314, the dynamic tunnel state 450 is also provided to the common acceleration and optimization processor 126 with the packet data 324 as an associated dynamic tunnel state 326. For a nested tunnel data packet, multiple dynamic tunnel states 326, for respective tunnel layers, may be generated and provided to the common acceleration and optimization processor 126. In some implementations, if a first dynamic tunnel state for the current tunnel data packet 314 (or a portion thereof) is unchanged from a second dynamic tunnel state for the tunnel data packet previously received for the current packet context, it may not be provided to the common acceleration and optimization processor 126. For an un-tunneled data packet such as the example data packet 200 depicted in FIG. 2A, the input data packet processor 310 simply delivers the received data packet 312 as the packet data 324 to the common acceleration and optimization processor 126. In an implementation in which a context identifier is included with the packet data 324 (for example, an implementation supporting nested tunneling), the context identifier 410 (see FIG. 4) for the outermost packet context 364 may also be included in the packet data 324 for the un-tunneled data packet.

In response to receiving the packet data 324, and in some circumstances the associated dynamic tunnel state 326, from the input data packet processor 310, the common acceleration and optimization processor 126 may transmit corresponding data for a new data packet via the backhaul network interface 128 and the satellite 130 to the common acceleration and optimization processor 144 included in the second network node device 140 (see FIG. 1). For example, the common acceleration and optimization processor 126 may transmit the packet data 324, the context identifier, and/or the dynamic tunnel state received from the input data packet processor 310. In response to receiving via the backhaul network interface 128 such data for a new data packet (such as from the second network node device 140), or in certain other circumstances (for example, providing cached data), the common acceleration and optimization processor 126 may be configured to provide a corresponding packet data 344 and dynamic tunnel state 346 to the output data packet generator 330, in response to which the output data packet generator 330 instantiates a corresponding new data packet 332. In some circumstances, in response to receiving the packet data 324 from the input data packet processor 310, the common acceleration and optimization processor 126 may generate and transmit, and in some cases also receive, one or more acceleration data packets via the backhaul link to implement an acceleration function. For example, a TCP PEP transport acceleration packet or an acceleration packet including caching data.

In some implementations, the data communication system 100 supports quality of service (QoS) or other prioritization techniques for transferring data packets via the backhaul link between the first network node device 120 and the second network node device 140. For example, the common acceleration and optimization processor 126 may be configured to selectively assigned data packets to various data flows with different data transfer characteristics, such as, but not limited to, bandwidth, latency, and/or guarantees for delivery. For some such implementations, the input data packet processor 310 is configured to, for some tunnel data packets, generate a packet priority 328 that is provided to the common acceleration and optimization processor 126 with a packet data 324. For example, a tunnel protocol submodule 350 may be configured to, based on at least a tunneling protocol-specific portion of a tunnel data packet, generate a priority value for a tunnel data packet that is used by the input data packet processor 310 to generate the packet priority 328. The tunnel protocol submodule 350 may be configured to generate the priority value as part of generating a dynamic tunnel state 326. As an example, for the tunnel data packet 230 shown in FIG. 2C, in which the payload 240 is encapsulated according to the IEEE 801.1Q tunneling protocol, the VLAN Priority Code Point (PCP) field of the 801.1Q tag 236 may be used to generate a priority value for an IEEE 801.1Q tunneled data packet. The eight different values that may be used for the PCP field may be translated to appropriate values understood by the common acceleration and optimization processor 126 by the tunnel protocol submodule 350, the input data processor 310, and/or a priority translator (not shown in FIG. 3) between the input data processor 310 and the common acceleration and optimization processor 126.

The output data packet generator 330 is configured to receive a new tunnel notification 342 including a corresponding static tunnel state; in some implementations, from the common acceleration and optimization processor 126 (see FIG. 1). In response to receiving the new tunnel notification 342, the output data packet generator 330 causes the packet context module 360 to instantiate a corresponding second packet context 368 included in the packet contexts 362 maintained by the packet context module 360. In some implementations, the new tunnel notification 342 includes values for use as, for effective for determining, the unique context identifier 410, parent context identifier 420, and tunneling protocol submodule identifier 430 of the new second packet context 368 instantiated in response to the new tunnel notification 342.

The output data packet generator 330 is further configured to generate outgoing Layer-2 data packets 332 based on at least packet data 344 and any associated dynamic tunnel state 346 received from the common acceleration and optimization processor 126 (see FIG. 1). As described for the packet data 324, the packet data 344 is accompanied by a context identifier effective for selecting a corresponding packet context 362. Where the identified packet context is associated with the outermost packet context 364, an untunneled data packet 332 is output by the output data packet generator 330 with the packet data 324.

Otherwise, the output data packet generator 330 generates a tunnel data packet 334 that encapsulates the packet data 344. To generate the tunnel data packet 334, a packet context 362 corresponding to the context identifier provided with the packet data 344 is identified and selected. In some implementations, the context identifier provided with the packet data 344 includes a portion indicating a tunneling protocol type for the packet context 362, which may be used to select a tunneling protocol. Then the packet data 344 is encapsulated according to the selected packet context 362; for example, the tunneling protocol submodule identifier associated with the selected packet context 362 is used, based on at least the static tunnel state 440 for the packet context 362 and any dynamic tunnel state 346 received in association with the packet data 344 for the packet context 362. The dynamic tunnel state 346 may also be used to update the dynamic tunnel state 450 of the selected packet context 362. At this point, and if nested tunneling is supported, the second packet context 368 is considered a 'current' packet context, and the just-encapsulated packet data 344 is considered a 'current' payload. While the parent context identifier 420 of the current packet context is not for the outermost packet context 364 (as would occur for a nested tunnel data packet), the packet context 362 corresponding to the parent context identifier 420 becomes the new current packet context and the current payload is encapsulated according to the new current packet context to become a new current payload. Once the parent context identifier 420 of the current packet context is for the outermost packet context 364, encapsulation of the packet data 344 as an innermost payload of the tunnel data packet 334, including for nested tunneling if it applies, is complete and the current payload is output as the tunnel data packet 334. The output data packet generator 330 and/or the local network interface 122 may be configured to generate a Layer-2 header for the tunnel data packet 334.

Figure 5A:
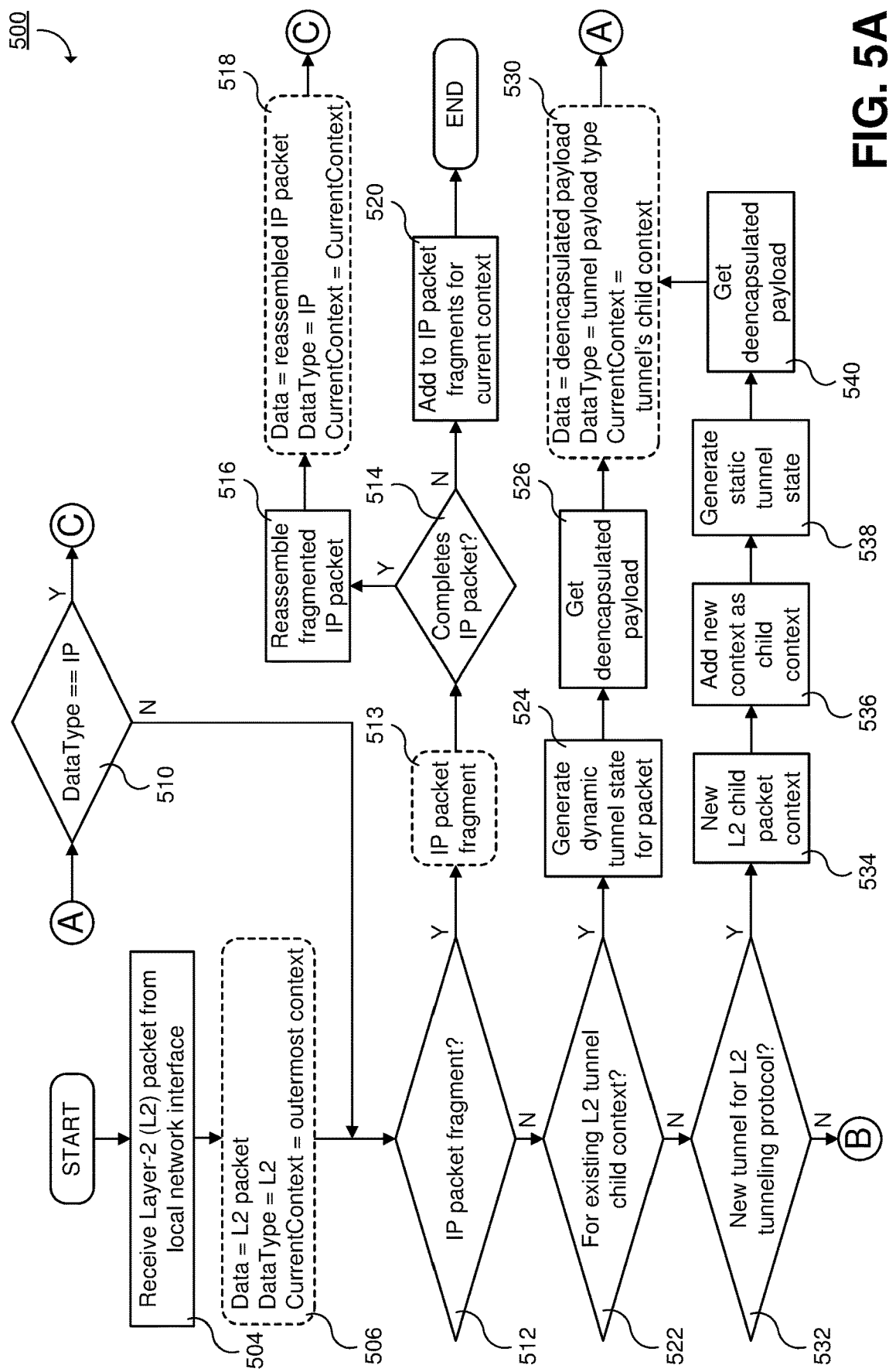
FIGS. 5A-5C illustrate respective portions of an example process flow diagram for processing of incoming Layer-2 data packets by the input data packet processor shown in FIG. 3.
Figure 5B:
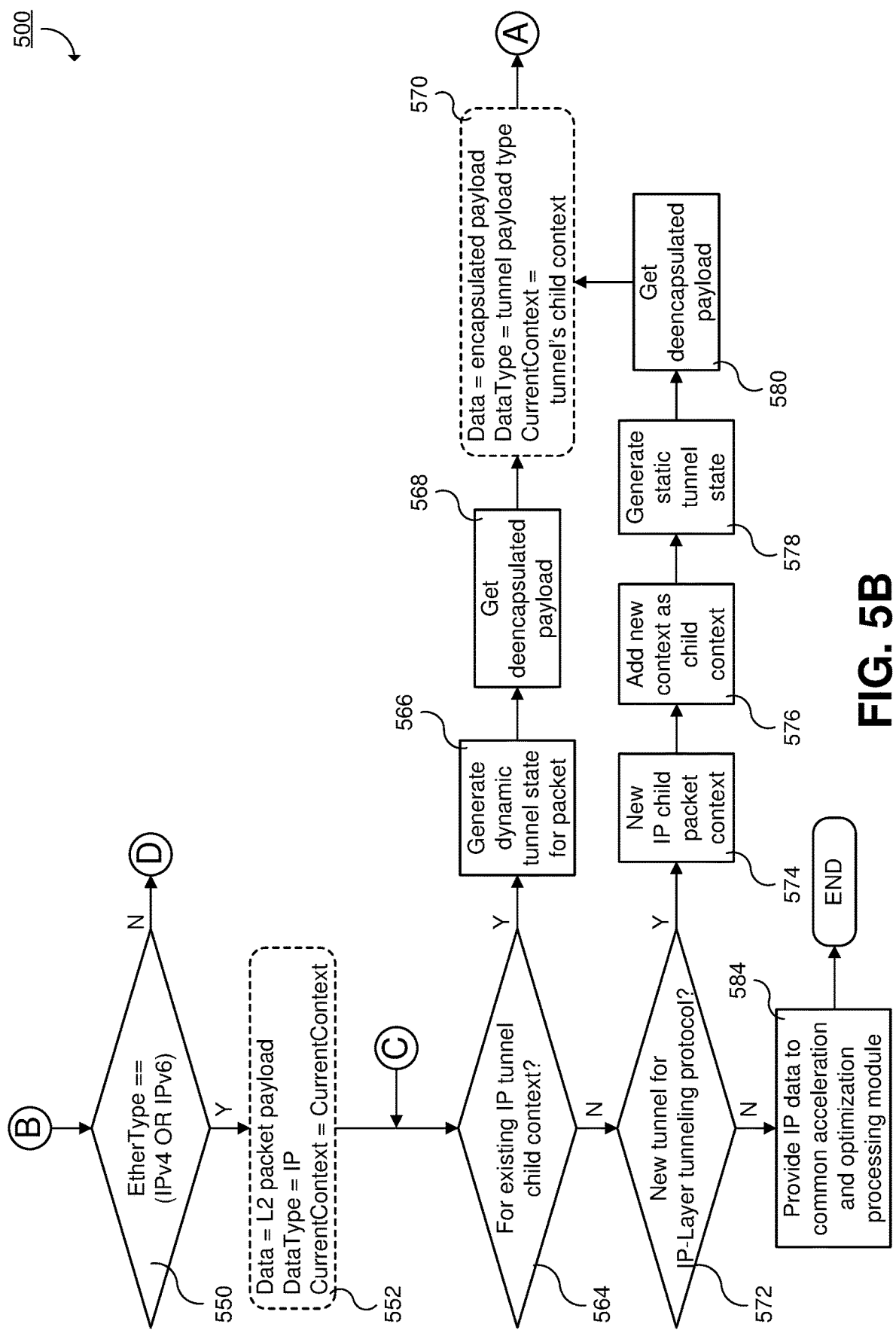
Figure 5C:
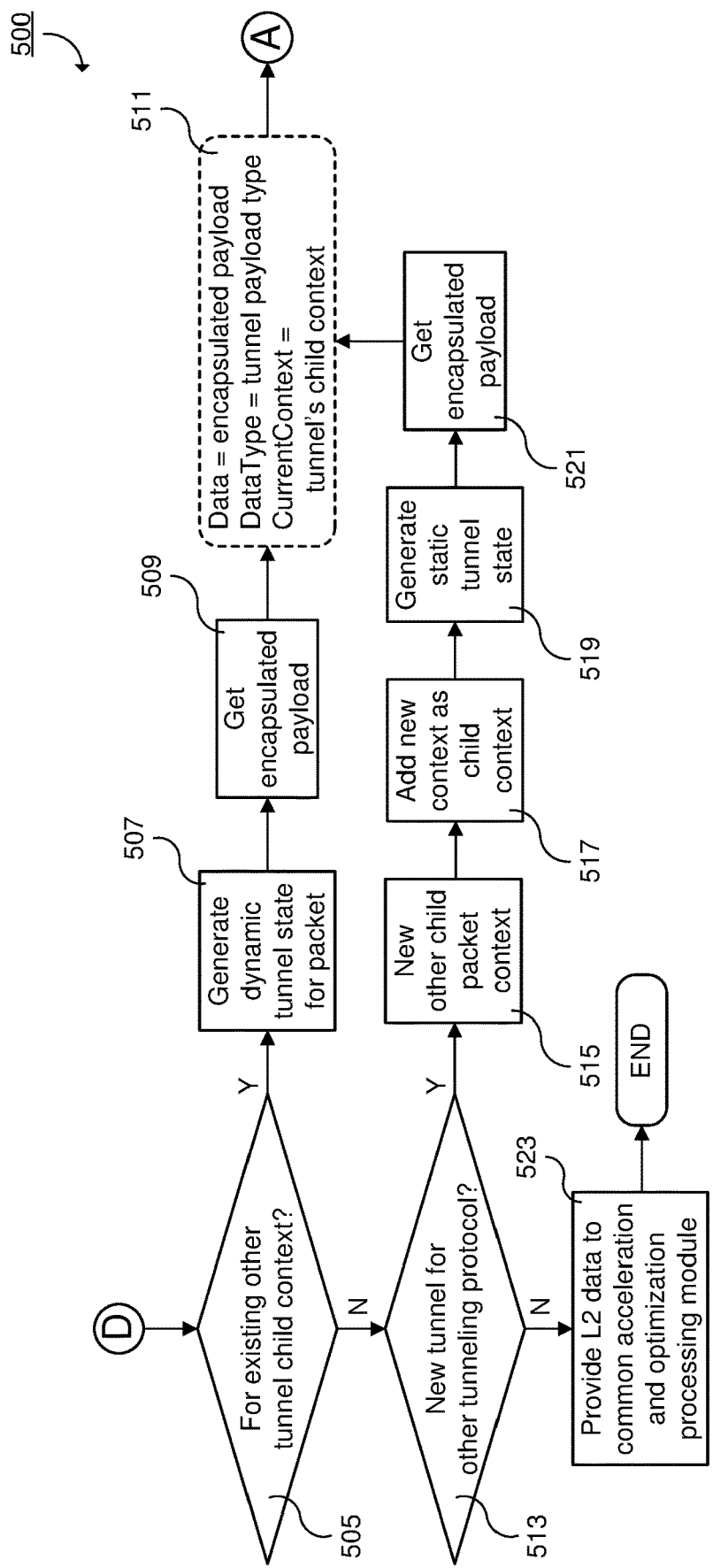

For purposes of clarity, FIGS. 5A-5C illustrate an example process flow diagram ("process") 500 for processing of incoming Layer-2 data packets by the input data packet processor 310 shown in FIG. 3. Thus, some of the steps described below will also refer to items described with reference to FIG. 3. As shown in FIG. 5A, the process begins with a first step 504 where the input data packet processor receives a Layer-2 ("L2") packet (such as, but not limited to, an Ethernet packet) from the local network interface 122 of FIG. 1 and the process 500 creates a corresponding current packet layer item 506 for which the Data is the Layer-2 packet, a DataType of "L2" (indicating the Data is for a Layer-2 packet, including, for example, a Layer-2 header), and a CurrentContext of the outermost packet context 364 described in FIG. 3.

The process 500 then determines at a second step 512 whether the current packet layer item is for an IP packet fragment. For example, for Layer-2 Ethernet, the current packet layer item may be identified as for an IPv4 packet fragment when an EtherType field of the current packet layer item is for an IPv4 (i.e., 0x0800) and fields of an IPv4 header portion of the data for the current packet layer item (such as the More Fragments and Fragment Offset fields) indicate IP packet fragmentation. If so (512, Y), the process 500 continues to third step 514 at which it determines whether the identified IP packet fragment 513 will, with one or more IP packet fragments previously identified for the current packet context (see IP packet fragments 470 in FIG. 4), provide all of the IP packet fragments needed to complete reassembly of an entire IP packet. If so (514, Y), at fourth step 516 the process reassembles the fragmented IP packet using the currently identified IP packet fragment 513 and its associated previously identified IP packet fragments for the current packet context (which are also removed from the IP packet fragments 470 of the current packet context). The Data for the current packet layer item then becomes the reassembled IP packet data, the DataType becomes "IP" (indicating the Data is for an IP packet, including an IP header), and the CurrentContext remains unchanged, as represented by the current data packet item 518. The process then continues in FIG. 5B (symbolized by a "C"), as will be discussed further below.

Returning to third step 514, if the currently identified IP packet fragment does not complete an IP packet (514, N) at fifth step 520 the process adds the newly identified IP packet fragment to the IP Packet Fragments 470 for the current packet context, and the process 500 ends. The process can then be repeated for the next L2 packet received by the local network interface 122 (see FIG. 1).

Returning to second step 512, if the current packet layer item is not for an IP packet fragment (512, N), at sixth step 522 the process 500 determines if the current packet layer item is for an existing L2 tunneling protocol child context of the current context. For example, for each of the Layer-2 tunneling protocol child context identifiers 462 in FIG. 4 for the current context, the corresponding child packet context is used in combination with its associated tunneling protocol submodule (see tunneling protocol identifier 430 in FIG. 4) to determine if the current packet layer item matches the tunnel for the child packet context. If so (522, Y), the matching child packet context is used to generate a new dynamic tunnel state, if any, for the current packet layer item at a seventh step 524. If a new dynamic tunnel state is generated, it is provided to the common acceleration and optimization processor 126 (see FIG. 1) in association with the packet received at first step 504. Then, at an eighth step 526, the tunneling protocol submodule for the matching child packet context is used to obtain the de-encapsulated payload from the current packet layer item.

The Data for the current packet layer item then becomes the de-encapsulated payload, the DataType becomes a payload type indicated by the tunneling protocol submodule, and the CurrentContext is changed to the matching child packet context, as represented by the current data packet item 530. The tunneling protocol submodule is configured to indicate the payload DataType, as it is specific to the tunneling protocol. For example, whereas the IPIP protocol is an IP-Layer tunneling protocol that carries an IP packet payload, the L2TP protocol is also an IP-Layer tunneling protocol that instead carries a Layer-2 packet payload. In order to determine if there is a nested tunnel within the de-encapsulated payload then the process can continue (symbolized by "A") at a ninth step 510, where a determination is made if the Data Type for the current packet layer item is for an IP packet. If so (510, Y), the process continues in FIG. 5B (symbolized by a "C"), as will be discussed further below. If not (510, N), and the DataType is for an L2 packet, the process 500 returns to second step 512.

Returning to sixth step 522, if the current packet layer item is not for an existing L2 tunneling protocol child context (522, N), at a tenth step 532 the process determines whether the current packet layer item is for a new L2 tunnel. For example, each of the Layer-2 tunneling protocol submodules 352 in FIG. 3 may be invoked to determine, based at least on the current packet layer item, whether the current packet layer item is encapsulating a payload according to the Layer-2 tunneling protocol associated with the invoked Layer-2 tunneling protocol submodule. If so (532, Y), the packet context module is used to create a new child packet context for the current packet context at an eleventh step 534. At a subsequent twelfth step 536 the context identifier for the newly created packet context is added to the Layer-2 tunneling protocol child context identifiers 462 for the current packet context. Additionally, at thirteenth step 538, the Layer-2 tunneling protocol submodule for the new packet context is used to generate a static tunnel state for the newly identified tunnel (see static tunnel state 440 in FIG. 4). This static tunnel state, along with a notification that a new tunnel has been identified, is provided to the common acceleration and optimization processor 126 in association with the L2 data packet received at the first step 504.

Furthermore, at a fourteenth step 540, the Layer-2 tunneling protocol submodule is also used to obtain the de-encapsulated payload from the current packet layer item and the current packet data context is updated as described in eighth step 526. The Data for the current packet layer item then becomes the de-encapsulated payload, the DataType becomes a payload type indicated by the tunneling protocol submodule, and the CurrentContext is changed to the matching child packet context, as represented by the current data packet item 530. Also, as described previously for the eighth step 526, in order to determine if there is a nested tunnel within the de-encapsulated payload then the process can continue (symbolized by "A") at ninth step 510, where a determination is made if the Data Type for the current packet layer item is for an IP packet. If so (510, Y), the process continues in FIG. 5B (symbolized by a "C"), as will be discussed further below. If not (510, N), and the Data Type is for an L2 packet, the process 500 returns to second step 512. Returning to tenth step 532, if the current packet layer item is not for a new tunnel for an L2 tunneling protocol (532, N) then the process continues on to FIG. 5B (symbolized by a "B"), discussed below.

Referring now to FIG. 5B, at a fifteenth step 550, the process determines whether an EtherType field of the current packet layer item is either for an IPv4 (i.e., 0x0800) or IPv6 packet (i.e., 0x86DD). If so (550, Y), the Data for the current packet layer item then becomes the L2 packet payload of the current packet layer item (for example, by removing or otherwise omitting a Layer-2 Ethernet header portion), the DataType becomes "IP", and the CurrentContext remains unchanged, as represented by the current data packet item 552. At a sixteenth step 564, the process 500 continues by determining if the current packet layer item is for an existing IP tunneling protocol child context of the current context. For example, for each of the IP-Layer tunneling protocol child context identifiers 464 in FIG. 4 for the current context, the corresponding child packet context is used in combination with its associated tunneling protocol submodule (see tunneling protocol identifier 430 in FIG. 4) to determine if the current packet layer item matches the tunnel for the child packet context. If so (564, Y), the matching child packet context is used to generate a new dynamic tunnel state, if any, for the current packet layer item at a seventeenth step 566. If a new dynamic tunnel state is generated, it is provided to the common acceleration and optimization processor 126 (see FIG. 1) in association with the packet received at first step 504. Then, at an eighteenth step 568, the tunneling protocol submodule for the matching child packet context is used to obtain the de-encapsulated payload from the current packet layer item.

The Data for the current packet layer item then becomes the de-encapsulated payload, the DataType becomes a payload type indicated by the tunneling protocol submodule, and the CurrentContext is changed to the matching child packet context, as represented by the current data packet item 570. In order to determine if there is a nested tunnel within the de-encapsulated payload then the process can continue (symbolized by "A") at the ninth step 510 (see previous FIG. 5A).

Returning to sixteenth step 564, if the current packet layer item is not for an existing IP tunneling protocol child context (564, N), at a nineteenth step 574 the process determines whether the current packet layer item is for a new tunnel for an IP-Layer tunneling protocol. For example, each of the IP-Layer tunneling protocol submodules 354 in FIG. 3 may be invoked to determine, based at least on the current packet layer item, whether the current packet layer item is encapsulating a payload according to the IP-Layer tunneling protocol associated with the invoked IP-Layer tunneling protocol submodule. If so (572, Y), the packet context module is used to create a new child packet context for the current packet context at a twentieth step 574.

At a subsequent twenty-first step 576 the context identifier for the newly created packet context is added to the IP-Layer tunneling protocol child context identifiers 464 for the current packet context. Additionally, at twenty-second step 578, the IP-Layer tunneling protocol submodule for the new packet context is used to generate a static tunnel state for the newly identified tunnel (see static tunnel state 440 in FIG. 4). This static tunnel state, along with a notification that a new tunnel has been identified, is provided to the common acceleration and optimization processor 126 in association with the L2 data packet received at the first step 504.

Furthermore, at a twenty-third step 580, the IP-Layer tunneling protocol submodule is also used to obtain the de-encapsulated payload from the current packet layer item and the current packet data context is updated as described in the eighteenth step 568. The Data for the current packet layer item then becomes the de-encapsulated payload, the DataType becomes a payload type indicated by the tunneling protocol submodule, and the CurrentContext is changed to the matching child packet context, as represented by the current data packet item 570. Also as described previously for the eighteenth step 568, in order to determine if there is a nested tunnel within the de-encapsulated payload then the process can continue (symbolized by "A") at the ninth step 510 (see FIG. 5A).

Returning to nineteenth step 572, if a new tunnel for an IP-Layer tunneling protocol is not identified (572, N), at a twenty-fourth step 584, data from the current packet layer item including the Data, DataType, and CurrentContext are provided to the common acceleration and optimization processor 126, which concludes the processing by the input data packet processor 310 of the data packet received at the first step 504.

Returning to fifteenth step 550, if the current packet layer item is not for an IP packet (550, N), the process continues in FIG. 5C (symbolized by a "D"), as will now be discussed below. In FIG. 5C, at a twenty-fifth step 505 the process 500 continues by determining if the current packet layer item is for an existing other tunneling protocol child context of the current context. For example, for each of the other tunneling protocol child context identifiers 466 in FIG. 4 for the current context, the corresponding child packet context is used in combination with its associated tunneling protocol submodule (see tunneling protocol identifier 430 in FIG. 4) to determine if the current packet layer item matches the tunnel for the child packet context. If so (505, Y), the matching child packet context is used to generate a new dynamic tunnel state, if any, for the current packet layer item at a twenty-sixth step 507. If a new dynamic tunnel state is generated, it is provided to the common acceleration and optimization processor 126 (see FIG. 1) in association with the data packet received at first step 504. Then, at a twenty-seventh step 509, the tunneling protocol submodule for the matching child packet context is used to obtain the de-encapsulated payload from the current packet layer item.

The Data for the current packet layer item then becomes the de-encapsulated payload, the DataType becomes a payload type indicated by the tunneling protocol submodule, and the CurrentContext is changed to the matching child packet context, as represented by the current data packet item 511. In order to determine if there is a nested tunnel within the de-encapsulated payload then the process can continue (symbolized by "A") at the ninth step 510 (see previous FIG. 5A).

Returning to the twenty-fifth step 505, if the current packet layer item is not for an existing other tunneling protocol child context (505, N), at a twenty-eighth step 513 the process determines whether the current packet layer item is for a new other tunnel. For example, each of the other tunneling protocol submodules 356 in FIG. 3 may be invoked to determine, based at least on the current packet layer item, whether the current packet layer item is encapsulating a payload according to the other tunneling protocol associated with the invoked other tunneling protocol submodule. If so (513, Y), the packet context module is used to create a new child packet context for the current packet context at a twenty-ninth step 515.

At a subsequent thirtieth step 517 the context identifier for the newly created packet context is added to the other tunneling protocol child context identifiers 466 for the current packet context. Additionally, at a thirty-first step 519, the other tunneling protocol submodule for the new packet context is used to generate a static tunnel state for the newly identified tunnel (see static tunnel state 440 in FIG. 4). This static tunnel state, along with a notification that a new tunnel has been identified, is provided to the common acceleration and optimization processor 126 in association with the L2 data packet received at the first step 504.

Furthermore, at a thirty-second step 521, the other tunneling protocol submodule is also used to obtain the de-encapsulated payload from the current packet layer item and the current packet data context is updated as described in the twenty-seventh step 509. The Data for the current packet layer item then becomes the de-encapsulated payload, the DataType becomes a payload type indicated by the tunneling protocol submodule, and the CurrentContext is changed to the matching child packet context, as represented by the current data packet item 511. Also as described previously for the twenty-seventh step 509, in order to determine if there is a nested tunnel within the de-encapsulated payload then the process can continue (symbolized by "A") at the ninth step 510 (see FIG. 5A).

Returning to twenty-eighth step 513, if a new other protocol tunnel is not identified (513, N), at a thirty-third step 523, data from the current packet layer item including the Data, DataType, and CurrentContext are provided to the common acceleration and optimization processor 126, which concludes the processing by the input data packet processor 310 of the data packet received at the first step 504.

For purposes of clarity, an implementation of a method facilitating data communication will now be provided. In different implementations, the method can include a first step of receiving, at a first network node device, via a local network interface, a first tunnel data packet encapsulating a first payload according to a first tunneling protocol, a second tunnel data packet encapsulating a second payload according to the first tunneling protocol, and a third tunnel data packet encapsulating a third payload according to a second tunneling protocol that is different than the first tunneling protocol. In a second step, the method includes identifying a first tunnel session associated with the first tunnel data packet and a second tunnel session associated with the third tunnel data packet that is different than the first tunnel session, and a third step involves generating and maintaining a first packet context for the first tunnel session based on at least the received first tunnel data packet, and a second packet context for the second tunnel session based on at least the received third tunnel data packet. In addition, the method can include a fourth step of determining, based on at least the first packet context and the second tunnel data packet, that the second tunnel data packet is for the first tunnel session. A fifth step includes de-encapsulating the second payload from the second tunnel data packet in accordance with the first tunneling protocol, in response to the determination that the second tunnel data packet is for the first tunnel session, and a sixth step includes de-encapsulating the third payload from the third tunnel data packet in accordance with the second tunneling protocol in response to the determination that the third tunnel data packet is for the second tunnel session. Furthermore, a seventh step of the method can include submitting the second payload and the third payload to a common acceleration and optimization processor of the first network node device.

In other implementations, the method can include additional or alternate steps. For example, the method may further include receiving, at the first network node device, via the local network interface, a first un-tunneled data packet, and submitting the first un-tunneled data packet to the common acceleration and optimization processor of the first network node device. In another example, the generation of the second packet context includes assigning a unique context identifier and a tunneling protocol identifier to the second packet context and generating a static tunnel state describing encapsulation information including values re-used in subsequent tunnel data packets for the second tunnel session and/or data for use in calculating other values included in subsequent tunnel data packets for the second tunnel session. In such a case, the method can further include providing the unique context identifier, the tunneling protocol identifier, and the static tunnel state to the common acceleration and optimization processor.

In some implementations, the method can further include generating a dynamic tunnel state for the third tunnel data packet, where the dynamic tunnel state includes values of the third tunnel data packet that change without a pattern described by the static tunnel state, and providing the dynamic tunnel state to the common acceleration and optimization processor in association with the third tunnel data packet.

In another implementation, the method may also include receiving a notification indicating that a second network node device different than the first network node device identified a third tunnel session. In some cases, the notification include a unique first context identifier and a tunneling protocol identifier for the third tunnel session as well as a static tunnel state describing encapsulation information including values re-used in tunnel data packets for the third tunnel session and/or data for use in calculating other values included in tunnel data packets for the third tunnel session. The method may further include receiving, at the first network node device, a fourth payload and an associated second context identifier, and selecting a third tunneling protocol based on the second context identifier. In addition, the method can involve generating a fourth tunnel data packet encapsulating the fourth payload according to the third tunneling protocol based on at least the static tunnel state, and outputting the fourth tunnel data packet via the local network interface. In some implementations, the method also includes receiving, at the first network node device, a dynamic tunnel state associated with the fourth payload data, where generating the fourth tunnel data packet is based on at least the dynamic tunnel state and the static tunnel state.

As another example, the method can include receiving, at the first network node device, via a backhaul network interface, a cache data item, and then storing the cache data item at the first network node device. In addition, the method can include determining, by the common acceleration and optimization processor, that the cache data item fulfills a request included in the third payload, and then generating, by the common acceleration and optimization processor, a response to the request based at least on a content of the cache data item. Furthermore, the method can include generating, at the first network node device and based at least on the second packet context, a fourth tunnel data packet encapsulating a portion of the response according to the second tunneling protocol, and then outputting the fourth tunnel data packet via the local network interface.

In one implementation, the method may further include transmitting the third payload in combination with a unique identifier assigned to the second packet context via a backhaul network interface to a second network node device. In some other implementations, the method also includes generating, by the common acceleration and optimization processor, an acceleration data packet based at least on the third payload, transmitting the acceleration data packet via a backhaul network interface to a second network node device, and generating, by the common acceleration and optimization processor, a response to the third payload. In addition, the method can include generating, at the first network node device and based at least on the second packet context, a fourth tunnel data packet encapsulating a portion of the response according to the second tunneling protocol, and then outputting the fourth tunnel data packet via the local network interface.

The detailed examples of systems, devices, and techniques described in connection with FIGS. 1-5C are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-5B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a communication network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 6:
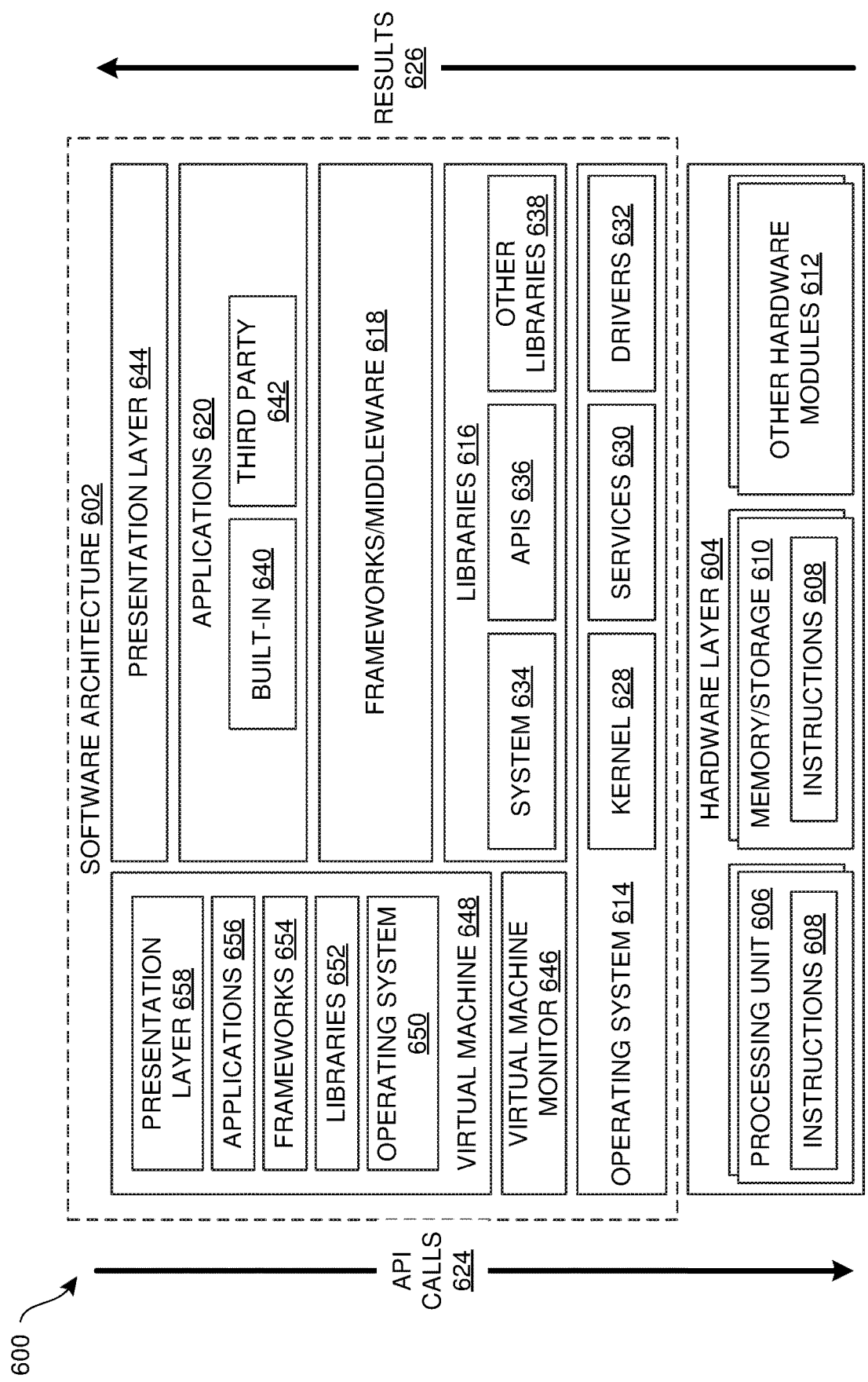
FIG. 6 is a block diagram illustrating an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. A representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular platform. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 700 of FIG. 7, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
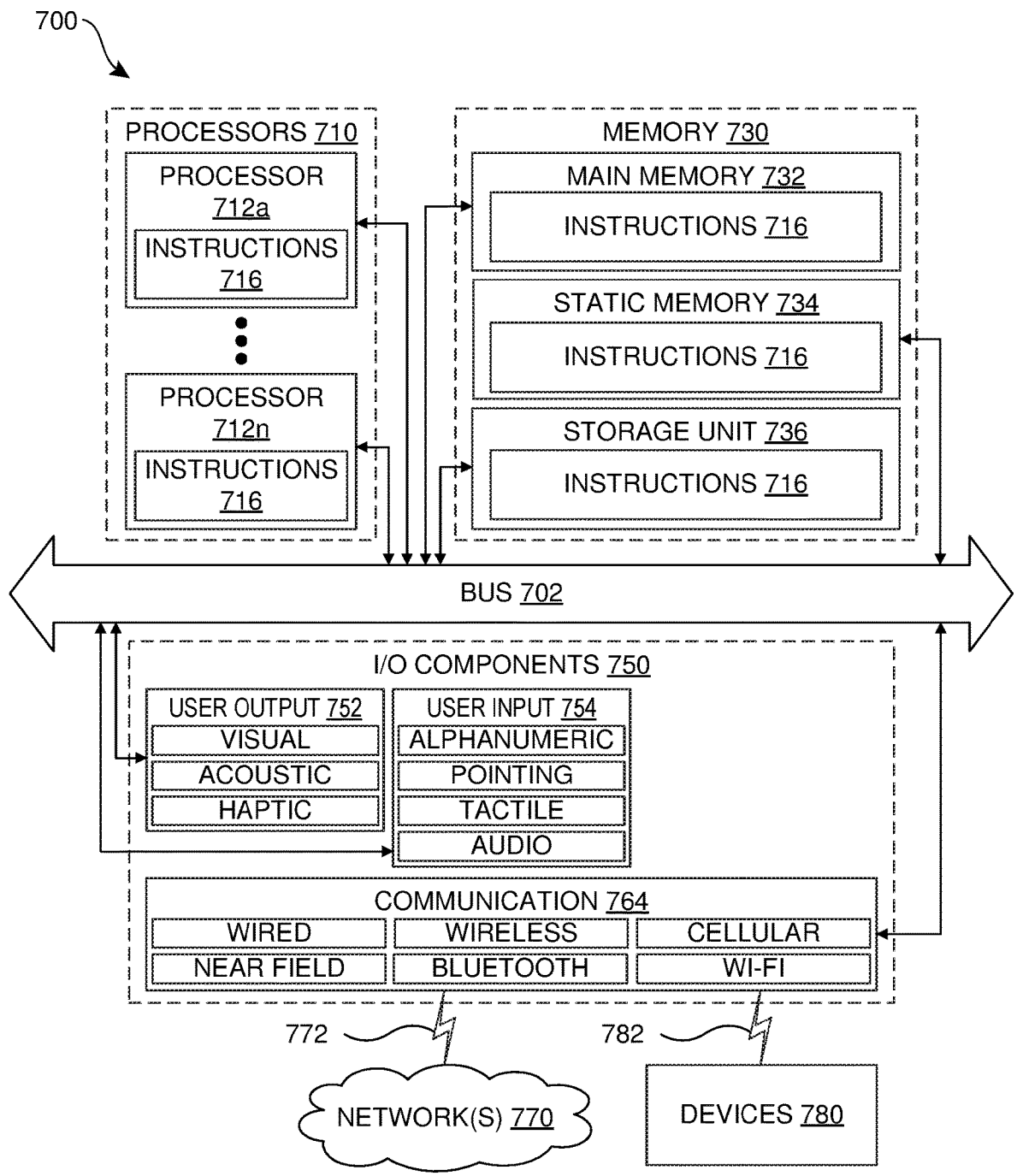
FIG. 7 is a block diagram illustrating components of an example machine configured to read instructions from a machine-readable medium and perform any of the described features.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" include a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors $712a$ to $712n$ that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for facilitating data communication comprising:
   receiving, at a first network node device, via a local network interface, a first tunnel data packet encapsulating a first payload according to a first tunneling protocol, a second tunnel data packet encapsulating a second payload according to the first tunneling protocol, and a third tunnel data packet encapsulating a third payload according to a second tunneling protocol that is different than the first tunneling protocol;
   identifying, at the first network node device, a first tunnel session associated with the first tunnel data packet and a second tunnel session associated with the third tunnel data packet that is different than the first tunnel session;
   generating and maintaining, at the first network node device, a first packet context for the first tunnel session based on at least the received first tunnel data packet, and a second packet context for the second tunnel session based on at least the received third tunnel data packet;
   determining, at the first network node device and based on at least the first packet context and the second tunnel data packet, that the second tunnel data packet is for the first tunnel session;
   in response to the determination that the second tunnel data packet is for the first tunnel session, de-encapsulating, at the first network node device, the second payload from the second tunnel data packet in accordance with the first tunneling protocol;
   in response to the determination that the third tunnel data packet is for the second tunnel session, de-encapsulating, at the first network node device, the third payload from the third tunnel data packet in accordance with the second tunneling protocol; and
   submitting the second payload and the third payload to a common acceleration and optimization processor of the first network node device.

2. The method of claim 1, further comprising:
   receiving, at the first network node device, via the local network interface, a first un-tunneled data packet; and
   submitting, at the first network node device, the first un-tunneled data packet to the common acceleration and optimization processor of the first network node device.

3. The method of claim 1, wherein:
   the generation of the second packet context includes assigning a unique context identifier and a tunneling protocol identifier to the second packet context and generating a static tunnel state describing encapsulation information including values re-used in subsequent tunnel data packets for the second tunnel session and/or data for use in calculating other values included in subsequent tunnel data packets for the second tunnel session; and
   the method further comprises transmitting, at the first network node device, the unique context identifier, the tunneling protocol identifier, and the static tunnel state to a second network node device via a backhaul network interface.

4. The method of claim 3, further comprising:
   generating, at the first network node device, a dynamic tunnel state for the third tunnel data packet, wherein the dynamic tunnel state includes values of the third tunnel data packet that change without a pattern described by the static tunnel state; and
   providing, at the first network node device, the dynamic tunnel state to the common acceleration and optimization processor in association with the third tunnel data packet.

5. The method of claim 1, further comprising:
   receiving, at the first network node device, a notification indicating that a second network node device different than the first network node device identified a third tunnel session, the notification including a unique first context identifier, a tunneling protocol identifier for the third tunnel session, and a static tunnel state describing encapsulation information including values re-used in tunnel data packets for the third tunnel session and/or data for use in calculating other values included in tunnel data packets for the third tunnel session;
   receiving, at the first network node device, a fourth payload and an associated second context identifier;
   selecting, at the first network node device, a third tunneling protocol based on the second context identifier;
   generating, at the first network node device, a fourth tunnel data packet encapsulating the fourth payload according to the third tunneling protocol based on at least the static tunnel state; and
   outputting, at the first network node device, the fourth tunnel data packet via the local network interface.

6. The method of claim 5, further comprising:
   receiving, at the first network node device, a dynamic tunnel state associated with the fourth payload data; and
   wherein generating the fourth tunnel data packet is based on at least the dynamic tunnel state and the static tunnel state.

7. The method of claim 1, further comprising:
   receiving, at the first network node device, via a backhaul network interface, a cache data item;
   storing, at the first network node device, the cache data item at the first network node device;
   determining, at the first network node device, by the common acceleration and optimization processor, that the cache data item fulfills a request included in the third payload;
   generating, at the first network node device, by the common acceleration and optimization processor, a response to the request based at least on a content of the cache data item;
   generating, at the first network node device, at the first network node device and based at least on the second packet context, a fourth tunnel data packet encapsulating a portion of the response according to the second tunneling protocol; and
   outputting, at the first network node device, the fourth tunnel data packet via the local network interface.

8. The method of claim 1, further comprising transmitting, at the first network node device, the third payload in combination with a unique identifier assigned to the second packet context via a backhaul network interface to a second network node device.

9. The method of claim 1, further comprising:
   generating, at the first network node device, by the common acceleration and optimization processor, an acceleration data packet based at least on the third payload;
   transmitting, at the first network node device, the acceleration data packet via a backhaul network interface to a second network node device;

generating, at the first network node device, by the common acceleration and optimization processor, a response to the third payload;

generating, at the first network node device and based at least on the second packet context, a fourth tunnel data packet encapsulating a portion of the response according to the second tunneling protocol; and outputting, at the first network node device, the fourth tunnel data packet via the local network interface.

10. A nontransitory machine readable medium, including program instructions which, when executed by the first network node device, cause the first network node device to perform the method of claim 1.

11. A data communication network node device comprising:

a common acceleration and optimization processor;

a local network interface; and an input data packet processor configured to:

receive, via the local network interface, a first tunnel data packet encapsulating a first payload according to a first tunneling protocol, a second tunnel data packet encapsulating a second payload according to the first tunneling protocol, and a third tunnel data packet encapsulating a third payload according to a second tunneling protocol that is different than the first tunneling protocol;

identify a first tunnel session associated with the first tunnel data packet and a second tunnel session associated with the third tunnel data packet that is different than the first tunnel session;

generate and maintain a first packet context for the first tunnel session based on at least the received first tunnel data packet, and a second packet context for the second tunnel session based on at least the received third tunnel data packet;

determine, based on at least the first packet context and the second tunnel data packet, that the second tunnel data packet is for the first tunnel session;

in response to the determination that the second tunnel data packet is for the first tunnel session, de-encapsulate the second payload from the second tunnel data packet in accordance with the first tunneling protocol;

in response to the determination that the third tunnel data packet is for the second tunnel session, de-encapsulate the third payload from the third tunnel data packet in accordance with the second tunneling protocol; and submit the second payload and the third payload to the common acceleration and optimization processor.

12. The device of claim 11, wherein the input data packet processor is further configured to:

receive, via the local network interface, a first un-tunneled data packet; and submit the first un-tunneled data packet to the common acceleration and optimization processor of the first network node device.

13. The device of claim 11, wherein:

the data communication network node device further comprises a backhaul network interface; and the input data packet processor is further configured to:

generate the second packet context by assigning a unique context identifier and a tunneling protocol identifier to the second packet context and generating a static tunnel state describing encapsulation information including values re-used in subsequent tunnel data packets for the second tunnel session and/or data for use in calculating other values included in subsequent tunnel data packets for the second tunnel session; and provide the unique context identifier, the tunneling protocol identifier, and the static tunnel state to the backhaul network interface for transmission to another data communication network node device.

14. The device of claim 13, wherein the input data packet processor is further configured to:

generate a dynamic tunnel state for the third tunnel data packet, wherein the dynamic tunnel state includes values of the third tunnel data packet that change without a pattern described by the static tunnel state; and provide the dynamic tunnel state to the common acceleration and optimization processor in association with the third tunnel data packet.

15. The device of claim 11, further comprising an output data packet processor is configured to:

receive a notification from the common acceleration and optimization processor indicating that a second network node device different than the first network node device identified a third tunnel session, the notification including a unique first context identifier, a tunneling protocol identifier for the third tunnel session, and a static tunnel state describing encapsulation information including values re-used in tunnel data packets for the third tunnel session and/or data for use in calculating other values included in tunnel data packets for the third tunnel session;

receive, from the common acceleration and optimization processor, a fourth payload and an associated second context identifier;

select a third tunneling protocol based on the second context identifier;

generate a fourth tunnel data packet encapsulating the fourth payload according to the third tunneling protocol based on at least the static tunnel state; and output the fourth tunnel data packet via the local network interface.

16. The device of claim 15, wherein the output data packet processor is further configured to:

receive, from the common acceleration and optimization processor, a dynamic tunnel state associated with the fourth payload data; and generate the fourth tunnel data packet based on at least the dynamic tunnel state and the static tunnel state.

17. The device of claim 11, wherein:

the device further comprises a backhaul network interface;

the common acceleration and optimization processor is configured to:

receive, via the backhaul network interface, a cache data item;

store the cache data item;

determine that the cache data item fulfills a request included in the third payload; and generate a response to the request based at least on a content of the cache data item; and the device is configured to:

generate, based at least on the second packet context, a fourth tunnel data packet encapsulating a portion of the response according to the second tunneling protocol; and output the fourth tunnel data packet via the local network interface.

18. The device of claim 11, wherein:

the device further comprises a backhaul network interface; and the common acceleration and optimization processor is configured to transmit the third payload in combination with a unique identifier assigned to the second packet context via the backhaul network interface to a second network node device.

19. The device of claim 11, wherein:

the device further comprises a backhaul network interface; and the common acceleration and optimization processor is configured to:

- generate an acceleration data packet based at least on the third payload;
- transmit the acceleration data packet via the backhaul network interface to a second network node device;
- generate a response to the third payload; and the device is configured to:

- generate, based at least on the second packet context, a fourth tunnel data packet encapsulating a portion of the response according to the second tunneling protocol; and
- output the fourth tunnel data packet via the local network interface.

* * * * *